(12) United States Patent
Hasegawa et al.

(10) Patent No.: US 6,988,059 B1
(45) Date of Patent: Jan. 17, 2006

(54) RENDERING METHOD AND DEVICE, GAME DEVICE, AND COMPUTER-READABLE RECORDING MEDIUM FOR STORING PROGRAM TO RENDER STEREO MODEL

(75) Inventors: Tsuyoshi Hasegawa, Tokyo (JP); Hitoshi Imai, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 780 days.

(21) Appl. No.: 09/661,806

(22) Filed: Sep. 14, 2000

(30) Foreign Application Priority Data

Sep. 14, 1999 (JP) .............................. H11-260072

(51) Int. Cl.
*G06T 17/00* (2006.01)

(52) U.S. Cl. ...................... 703/2; 345/420; 345/434; 345/441; 345/419; 345/421; 345/426; 345/431; 703/2

(58) Field of Classification Search ................ 703/1, 703/2; 382/154; 345/428, 429, 420, 426, 345/434, 441, 419–421, 431
See application file for complete search history.

(56) References Cited

U.S. PATENT DOCUMENTS

| | | | | |
|---|---|---|---|---|
| 4,910,611 A | * | 3/1990 | Cok | 358/453 |
| 5,880,736 A | * | 3/1999 | Peercy et al. | 345/426 |
| 6,151,026 A | * | 11/2000 | Iwade et al. | 345/420 |
| 6,281,902 B1 | * | 8/2001 | Nagashima | 345/419 |
| 6,343,987 B2 | * | 2/2002 | Hayama et al. | 463/1 |
| 6,363,169 B1 | * | 3/2002 | Ritter et al. | 382/154 |
| 6,549,202 B1 | * | 4/2003 | Hasegawa et al. | 345/426 |
| 6,549,288 B1 | * | 4/2003 | Migdal et al. | 356/603 |
| 6,603,479 B1 | * | 8/2003 | Mifune et al. | 345/474 |

FOREIGN PATENT DOCUMENTS

| | | |
|---|---|---|
| JP | 7-85310 | 3/1995 |
| JP | 7160905 | 6/1995 |
| JP | 8-96025 | 4/1996 |
| JP | 11232485 | 8/1999 |
| JP | 2000-250194 | 9/2000 |
| JP | 2000-251094 | 9/2000 |
| JP | 2000-2250194 | 9/2000 |

(Continued)

OTHER PUBLICATIONS

Thelma Thompson (Analyzing Color in Your Wardrobe, U of Nebraska, 1984).*

(Continued)

*Primary Examiner*—Anthony Knight
*Assistant Examiner*—Sunray Chang
(74) *Attorney, Agent, or Firm*—Greenblum & Bernstein, P.L.C.

(57) ABSTRACT

To make it possible to draw a contour of a stereo model arranged in a virtual space, by a simple processing, a contour drawing model is acquired during initialization (at Step S2). This contour drawing model contains a stereo model and has its individual planes reversed from the corresponding planes of the stereo model. In the setting of the state in a virtual space, the contour drawing model is arranged (at Step S3). If the contour is to be drawn for the stereo model (at Step S4), the contour drawing model is drawn (at Step S5). The contour drawing model is perspectively transformed, and only the face with respect to a viewpoint is drawn by erasing a hidden plane. As a result of this hidden plane erasure, the contour drawing model is partially drawn as a contour outside of the stereo model because it is larger than the stereo model. Finally, the stereo model is drawn as usual (at Step S6).

19 Claims, 21 Drawing Sheets

FOREIGN PATENT DOCUMENTS

JP 2000-84396 3/2001

OTHER PUBLICATIONS

Bernard Jancewicz (Electromagnetism using bivectors, Eur. J. Phys. 1 (1980) 179-185. printer in Ireland.*
American Heritage College Dictionary, Forth Edition.*
An English Language abstract of JP 7-85310.
An English Language abstract of JP 7-160905.
English Language Abstract of JP 2000-250194.
English Language Abstract of JP 11-232485.
English Language Abstract of JP 8-96025.
English Language Abstract of JP 2000-251094.
English Language Abstract of JP 2001-84396.

* cited by examiner

FACE

BACK n: a x b (OUTER PRODUCT)

RENDERING METHOD AND DEVICE, GAME DEVICE, AND COMPUTER-READABLE RECORDING MEDIUM FOR STORING PROGRAM TO RENDER STEREO MODEL

BACKGROUND OF THE INVENTION

1. Field of the Invention

The present invention relates to computer graphics (CG) and, more particularly, to a method and device for rendering a stereo model arranged in a virtual three-dimensional space, and its contour, and a computer-readable recording medium stored with a rendering program.

2. Description of Related Art

In recent years, the non-photorealistic rendering technique has been investigated in the field of CG. This non-photorealistic technique is intended to express a handwritten image with CG. As this technique, there have been a variety of image forming techniques for correctly drawing a contour of a stereo model automatically, even when the states of a viewpoint position or a direction of sight line, or the arrangement, direction or shape of the stereo model are changed. The stereo model is exemplified by a 3D object expressing a human-shaped character. This stereo is composed of a plurality of polygons, for example.

In the technique disclosed in Unexamined Published Japanese Patent Application No. 7-85310, for example, it is decided at first whether or not the individual sides of polygons composing a stereo model belong to the contour portions sides of polygons composing a stereo model belong to the contour portions. Then, the sides decided as the contour portions are drawn as the contour. In Unexamined Published Japanese Patent Application No. 7-160905, on the other hand, there is disclosed a technique for drawing the contour by employing the pixels in a display image to be rendered from the stereo model as a unit and by detecting whether or not the individual pixels belong to the contour portions.

In order to draw the contour, according to the prior art, it is necessary to detect the contour portions by decomposing the stereo model into the side units of polygons or the pixel units to be rendered. This makes the processing complicated for drawing the contour.

SUMMARY OF THE INVENTION

It is, therefore, an object of the invention to provide a rendering method and device capable of drawing a contour of a stereo model arranged in a virtual space, by a simple processing, and a computer-readable recording medium stored with a rendering program.

According to a first aspect of the invention, a rendering method for rendering a stereo model which is arranged in a virtual space and composed of a plurality of planes having faces on the outer side of an object to be expressed, comprises: acquiring a second stereo model corresponding to a first stereo model; making a contour drawing model by reversing the individual planes of the second stereo model; arranging the contour drawing model at a position containing the first stereo model; and drawing the first stereo model from a predetermined viewpoint position and drawing only the planes, as facing the viewpoint position, of the contour drawing model in a predetermined color.

According to a second aspect of the invention, the rendering method comprises: acquiring a contour drawing model corresponding to the stereo model and having sides reversed at its planes corresponding to the individual planes of the stereo model; arranging the contour drawing model at a position containing the stereo model; and drawing the stereo model from a predetermined viewpoint position and drawing only the planes, as facing the viewpoint position, of the contour drawing model in a predetermined color.

In the invention, what is drawn is the plane which has the reversed sides and faces the viewpoint position of the contour drawing model. As a result, the portion, as not overlapping the stereo model from the viewpoint position, of the contour drawing model is drawn as the contour.

The acquiring can also include acquiring a contour drawing model corresponding to and larger than the stereo model and having sides reversed at its planes corresponding to the individual planes of the stereo model. Likewise, it can also include acquiring a contour drawing model corresponding to the stereo model, having sides reversed at its planes corresponding to the individual planes of the stereo model and having vertexes corresponding to the individual vertexes of the planes composing the stereo model and set in the normal directions of the individual vertexes.

The color of the contour drawing model may be defined during acquisition and may be identical to the color of the stereo model or may be defined at an actual drawing time.

On the other hand, the acquiring can also include acquiring a contour drawing model corresponding to the stereo model, mapped with a texture having a pattern containing a change in brightness or transparency, and having sides reversed at its planes corresponding to the individual planes of the stereo model. If this texture mapping is executed, the drawn contour is as if it were hand-written.

According to a third aspect of the invention, the rendering method comprises: acquiring a contour drawing model corresponding to the stereo model; arranging the contour drawing model at a position containing the stereo model; and drawing the stereo model from a predetermined viewpoint position and drawing only the planes, as on the back of the viewpoint position, of the contour drawing model in a predetermined color.

What is different from the second aspect is the sides of the planes of the contour drawing model. In order to draw the stereo model as usual, the stereo model has to be hidden from the viewpoint position by the contour drawing model. In the second aspect, therefore, the sides of the planes of the contour drawing model are reversed from those of the corresponding planes of the stereo model so that the backs are eliminated from the drawn object. In the third aspect, the sides of the planes of the contour drawing model are identical to those of the stereo model so that similar effects may be obtained by drawing only the backs.

The arranging can include enlarging the size of the contour drawing model acquired at the first step and arranging the contour drawing model at a position containing the stereo model.

On the other hand, the third aspect of the invention can also include enlarging the size of the contour drawing model by moving the individual vertexes of the planes composing the contour drawing model acquired during the acquiring, in the normal directions of the individual vertexes. The arranging can also include arranging the contour drawing model enlarged during enlargement, at the position containing the stereo model. There can be conceived a method of moving planes in their normal directions by determining their normals.

Moreover, the arranging can include reducing the size of the stereo model and arranging the contour drawing model at the position containing the stereo model. Since the contour drawing model may be larger than the stereo model, it is conceivable to reduce the stereo model.

Moreover, the drawing can be conceived to be drawing the stereo model from the predetermined viewpoint position and drawing the planes, as on the back of the viewpoint position, of the contour drawing model by mapping only the planes with a texture having a pattern containing a change in brightness or transparency. By executing this texture mapping, the drawn contour is as if it were hand-written.

According to a fourth aspect of the invention, the program is a program for activating the computer acquire a contour drawing model corresponding to the stereo model and having sides reversed at its planes corresponding to the individual planes of the stereo model; arrange the contour drawing model at a position containing the stereo model; and draw the stereo model from a predetermined viewpoint position and drawing only the planes, as facing the viewpoint position, of the contour drawing model in a predetermined color.

To the fourth aspect of the invention, there can be applied modifications of the acquiring, as have been described in the second aspect.

According to a fifth aspect of the invention, a rendering program is a program for activating the computer to acquire a contour drawing model corresponding to the stereo model; to arrange the contour drawing model at a position containing the stereo model; and to draw the stereo model from a predetermined viewpoint position, drawing only the planes, as on the back of the viewpoint position, of the contour drawing model in a predetermined color.

The acquiring can also include acquiring a contour drawing model corresponding to and larger than the stereo model.

To the fifth aspect of the invention, too, there can be applied modifications of the arranging and the drawing, as have been described in the third aspect.

Here, the programs according to the fourth and fifth aspects of the invention are stored in a recording medium or a storage device such as a CD-ROM, a floppy disk, a memory cartridge, a memory or a hard disk. By causing the computer to read the program stored in the recording medium or storage device, the following rendering device or game device can be realized. In addition, the program can be easily distributed or sold as a software product independently of the device by the recording medium. By executing the program using the hardware or the computer, the graphics technique of the invention can be easily practiced by those hardwares.

According to a sixth aspect of the invention, a rendering device for rendering a stereo model which is arranged in a virtual space and composed of planes having faces on the outer side of an object to be expressed, comprises: an acquisition system that acquires a contour drawing model corresponding to the stereo model and having sides reversed at its planes corresponding to the individual planes of the stereo model; an arrangement system that arranges the contour drawing model at a position containing the stereo model; and a drawing system that draws the stereo model from a predetermined viewpoint position, drawing only the planes, as facing the viewpoint position, of the contour drawing model in a predetermined color. To this rendering device, there can be applied the modifications of the second aspect of the invention.

By causing the computer to execute the rendering method according to the second aspect of the invention, there can be obtained effects similar to those of the aforementioned rendering method. By causing the hardware such as the computer to execute the processing, therefore, the rendering technique of the invention can be easily executed by that hardware.

According to a seventh aspect of the invention, on the other hand, the rendering device comprises: an acquisition system that acquires a contour drawing model corresponding to the stereo model; an arrangement system that arranges the contour drawing model at a position containing the stereo model; and a drawing system that draws the stereo model from a predetermined viewpoint position, drawing only the planes, as on the back of the viewpoint position, of the contour drawing model in a predetermined color.

To this rendering device, there can be applied the modifications of the third aspect of the invention. By causing the computer to execute the rendering method according to the third aspect of the invention, there can be obtained effects similar to those of the aforementioned rendering method. By causing the hardware such as the computer to execute the processing, therefore, the rendering technique of the invention can be easily executed by that hardware.

According to an eighth aspect of the invention, a game device for rendering a stereo model which is arranged in a virtual space and composed of a plurality of planes having faces on the outer side of an object to be expressed, comprises: a computer; and a computer-readable recording medium stored with a program to be executed by the computer. Moreover, the program activates the computer to execute: an acquisition function to acquire a contour drawing model corresponding to the stereo model and having sides reversed at its planes corresponding to the individual planes of the stereo model; an arrangement function to arrange the contour drawing model at a position containing the stereo model; and a drawing function to draw the stereo model from a predetermined viewpoint position and drawing only the planes, as facing the viewpoint position, of the contour drawing model in a predetermined color. To this gate device, there can be applied the modifications which have been described in the second mode of the invention.

According to a ninth aspect of the invention, on the other hand, a game device comprises: a computer; and a computer-readable recording medium stored with a program to be executed by the computer. Moreover, the program activates the computer to execute: an acquisition function to acquire a contour drawing model corresponding to the stereo model; an arrangement function to arrange the contour drawing model at a position containing the stereo model; and a drawing function to draw the stereo model from a predetermined viewpoint position and drawing only the planes, as on the back of the viewpoint position, of the contour drawing model in a predetermined color. To this game device, there can be applied the modifications according to the third aspect of the invention.

DESCRIPTION OF THE PREFERRED EMBODIMENTS

Figure 1:
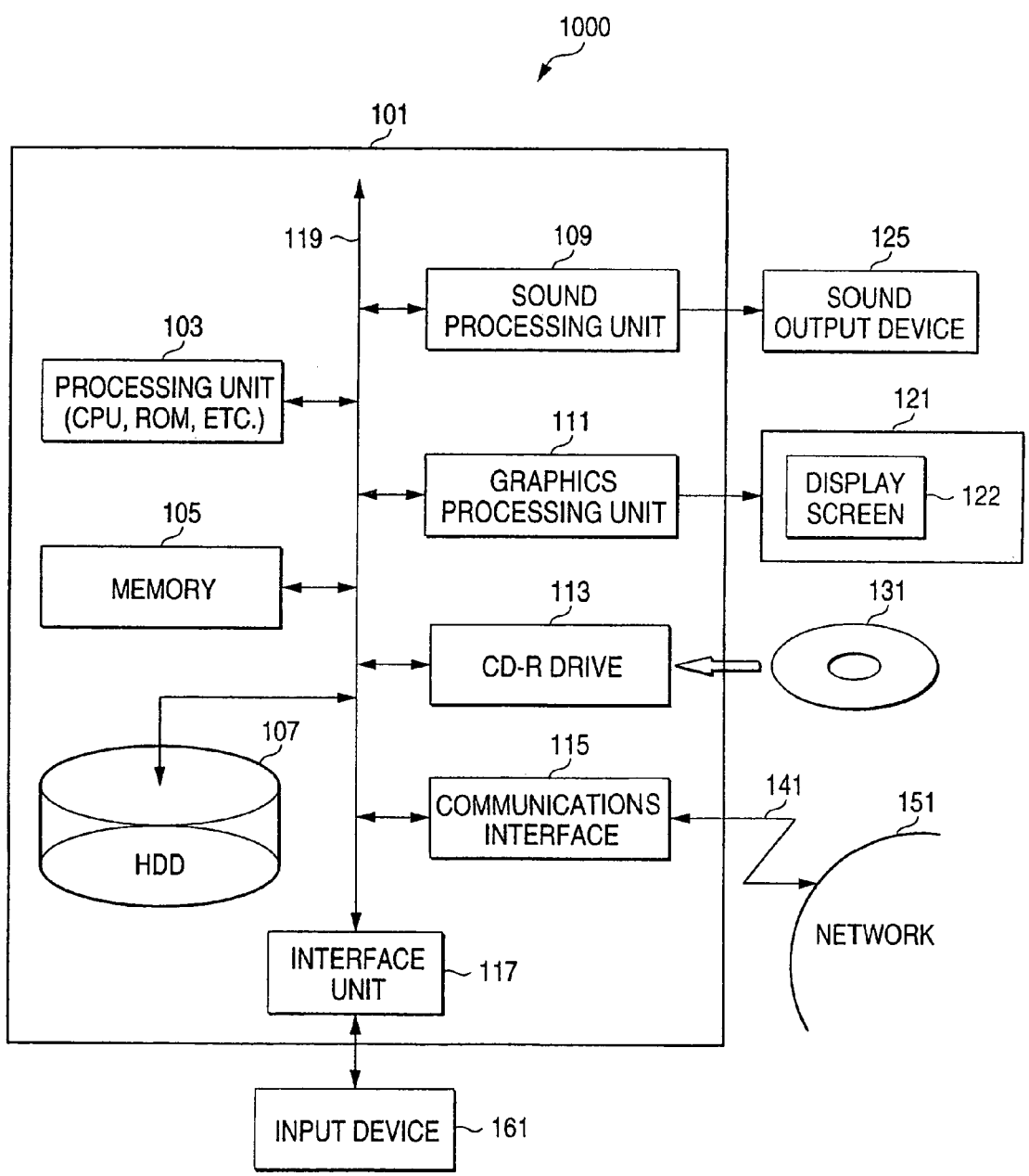
FIG. 1 is a block diagram showing one example of a computer for executing a program according to the invention.

First of all, FIG. 1 shows one example of a computer 1000 for executing a computer program, by which the invention is to be practiced. The computer 1000 comprises a computer body 101 including a processing unit 103, a memory 105, a hard disk drive HDD 107, a sound processing unit 109, a graphics processing unit 111, a CD-R drive 113, a communications interface 115 and an interface unit 117, which are connected with an internal bus 119, for example.

In this computer body 101, the sound processing unit 109 is connected with a sound output device 125 or a speaker, and the graphics processing unit 111 is connected with a display device 121 having a display screen 122. On the other hand, the CD-R drive 113 can be loaded with a CD-R 131. The communications interface 115 is connected through a communications medium 141 with a network 151. With the interface unit 117, there is connected an input device 161.

The processing unit 103 includes a CPU and a ROM and executes the program stored in the HDD 107 or the CD-R 131 to control the computer 1000. The memory 105 is a work area of the processing unit 103. The HDD 107 is a storage region for storing the program or data. The sound processing unit 109 interprets an instruction, which is made to output the sound by the program being executed by the processing unit 103, and outputs a sound signal to the sound output device 125.

In accordance with a drawing command output from the processing unit 103, the graphics processing unit 111 outputs a signal for making a display on the display screen of the display device 121. The CD-R drive 113 reads/writes the program and data in and from the CD-R 131. The communications interface 115 is connected through the communications medium 141 with the network 151 to have communications with other computers or the like. The interface unit 117 outputs the input from the input device 161 to the memory 105 so that the processing unit 103 interprets the input to execute the processing.

The program or data according to the invention are stored at first in the CD-R 131, for example. For the executions, moreover, the program and data are read by the CD-R drive 113 and loaded in the memory 105. The processing unit 103 processes the program and data, as loaded in the memory 105, according to the invention, and outputs the drawing command to the graphics processing unit 111. Here, the intermediate data are stored in the memory 105. In accordance with the drawing instruction from the processing unit 103, the graphics processing unit 111 executes the processing and outputs a signal to make a display in the display screen 122 of the display device 121.

Next, one example of the graphics processing unit 111 shown in FIG. 1 will be described in detail with reference to FIG. 2. This graphics processing unit 111 includes: a bus control unit 201 for exchanging the data with the internal bus 119; a geometric operation unit 207 and a triangle drawing processing unit 205 for exchanging the data with the bus control unit 201; a pixel color processing unit 209 for receiving the data from the triangle drawing processing unit 205; a Z-buffer 211 for storing the Z-value of each pixel and for being used by the pixel color processing unit 209; and a frame buffer 213 for storing the display screen data from the pixel color processing unit 209. Here, the display signal from the frame buffer 213 is output to the display device 121.

The bus control unit 201 of the graphics processing unit 111 receives the drawing command, as output from the processing unit 103, through the internal bus 119 and outputs it to the geometric operation unit 207 or the triangle drawing processing unit 205 in the graphics processing unit 111. As the case may be, the bus control unit 201 operates the output of the geometric operation unit 207 or the triangle drawing processing unit 205 through the internal bus 119 to the memory 105. The geometric operation unit 207 performs geometric operations to translate the coordinates, to locate the light source, or to reduce or enlarge the size. The geometric operation unit 207 outputs the result of the geometric operations to the triangle drawing processing unit 205.

The triangle drawing processing unit 205 interpolates the data of the individual vertexes of the triangular polygon to generate data at individual points in the triangular polygon. The pixel color processing unit 209 writes a display image in the frame buffer 213 by using the data at the individual points in the triangular polygon, as generated by the triangle drawing processing unit 205. At this time, the pixel color processing unit 209 erases the hidden face by using the Z-buffer 211.

If the processing unit 103 feeds the graphics processing unit 111 with a drawing command to perform a perspective transformation and a light source location by using data on the positions and colors of the individual vertexes of the triangular polygon in the universe coordinate system and the location of the light source, the following operations are performed in the graphics processing unit 111. In response to the drawing command, the bus control unit 201 outputs a command to the geometric operation unit 207. This geometric operation unit 207 performs the perspective transformations and the light source location to calculate the coordinate values (including the Z-value) and the colors at the individual vertexes of the triangular polygon in the screen coordinate system. The geometric operation unit 207 outputs these calculation results to the triangle drawing processing unit 205.

This triangle drawing processing unit 205 calculates the coordinate values (including the Z-value) and colors at the individual pixels in the triangular polygon by using the coordinate values (including the z-value) and colors at the individual vertexes of the triangular polygon. Moreover, the triangle drawing processing unit 205 outputs the coordinate values (including the Z-value) and the colors at the individual vertexes to the pixel color processing unit 209. This pixel color processing unit 209 reads the present Z-value of a noticed pixel and compares it with the Z-value output from the triangle drawing processing unit 205. If the output Z-value is smaller than the present one, the pixel color processing unit 209 stores the output z-value at such a storage position in the Z-buffer 211 as corresponds to that pixel, and the color of the pixel at such a storage position in the frame buffer 213 as corresponds to the coordinate value of the pixel.

Here, the color of the noticed pixel may be set with a transparency. In this case, the pixel color processing unit 209 synthesizes the color, which is stored at the storage position, as corresponding to the coordinate value of the pixel, in the frame buffer 213, and the color of the pixel on the basis of the transparency. As a result, a synthesized color is produced. The pixel color processing unit 209 stores the synthesized color thus produced, at the same storage position as before.

The following individual embodiments are practiced by the computer shown in FIG. 1.

Embodiment 1

Figure 3:
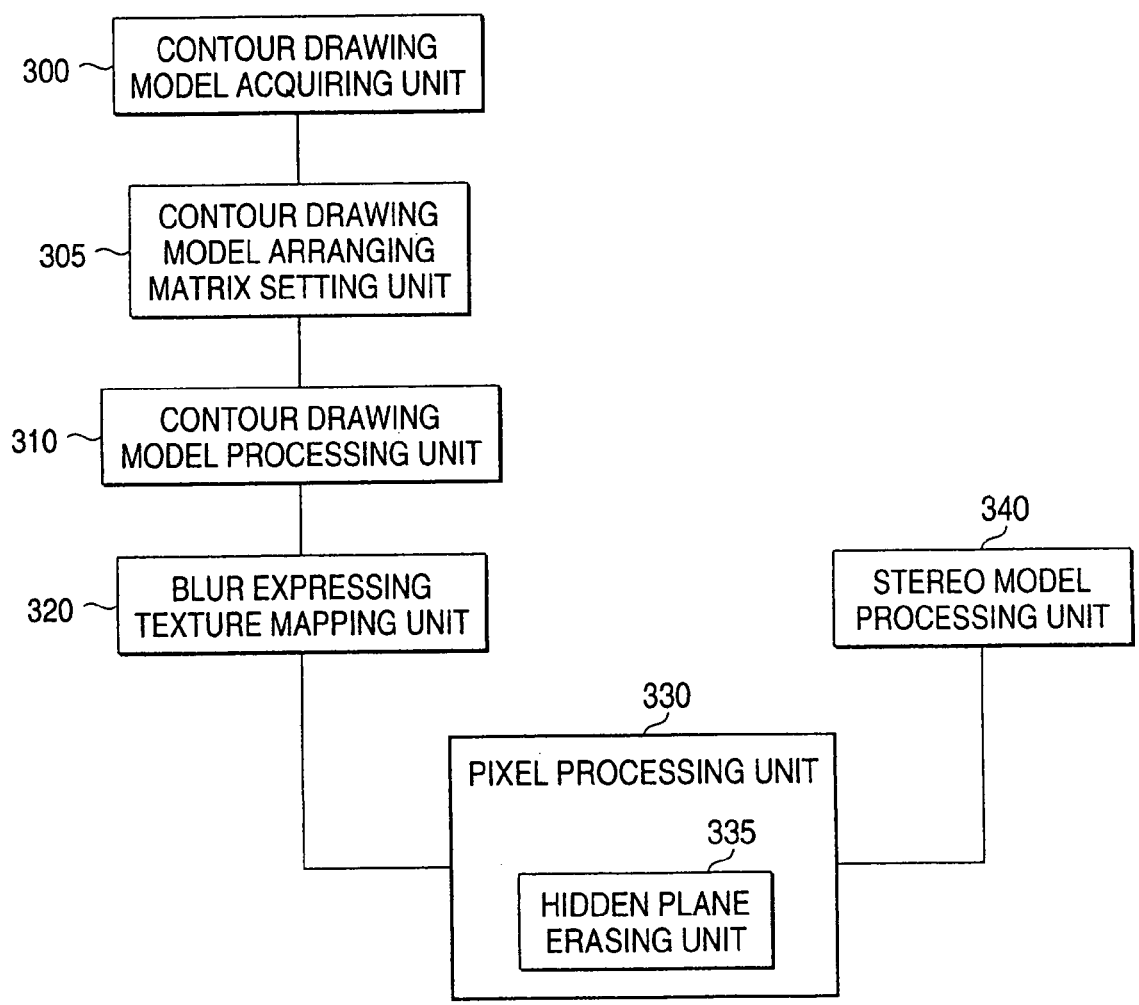
FIG. 3 is a functional block diagram of Embodiment 1.

Embodiment 1 of the invention will be schematically described with reference to the functional block diagram of FIG. 3.

A rendering device, as shown as Embodiment 1, includes a contour drawing model acquiring unit 300, a contour drawing model arranging matrix setting unit 305, a contour drawing model processing unit 310, a blur expressing texture mapping unit 320, a pixel processing unit 330 having a hidden plane erasing unit 335, and a stereo model processing unit 340.

The contour drawing model acquiring unit 300 makes a contour drawing model corresponding to a stereo model formed of a triangular polygon, for example. When the contour drawing model is made in advance, on the other hand, the contour drawing model acquiring unit 300 reads the contour drawing model formed of the triangular polygon, which has been made in advance. Here, each plane of the contour drawing model acquired is reversed in sides (i.e., the front face and back face of each polygon are reversed) from the corresponding plane of the stereo model. Moreover, the contour drawing model is made larger than the stereo model and also the colors at the time of drawing the contour model are preset. Here, the contour drawing model has to be finally made larger than the corresponding stereo model but may be as large at this stage as the stereo model. When a contour drawing model having the same size as that of the stereo model is acquired, the processing for enlarging the contour drawing model is executed before the contour drawing model is drawn. The colors of the contour drawing model, as acquired by the contour drawing model acquiring unit 300, may be identical to those of the corresponding stereo model. In this case, the contour drawing model acquired has its colors changed into colors different from the stereo model before it is drawn.

Figure 4:
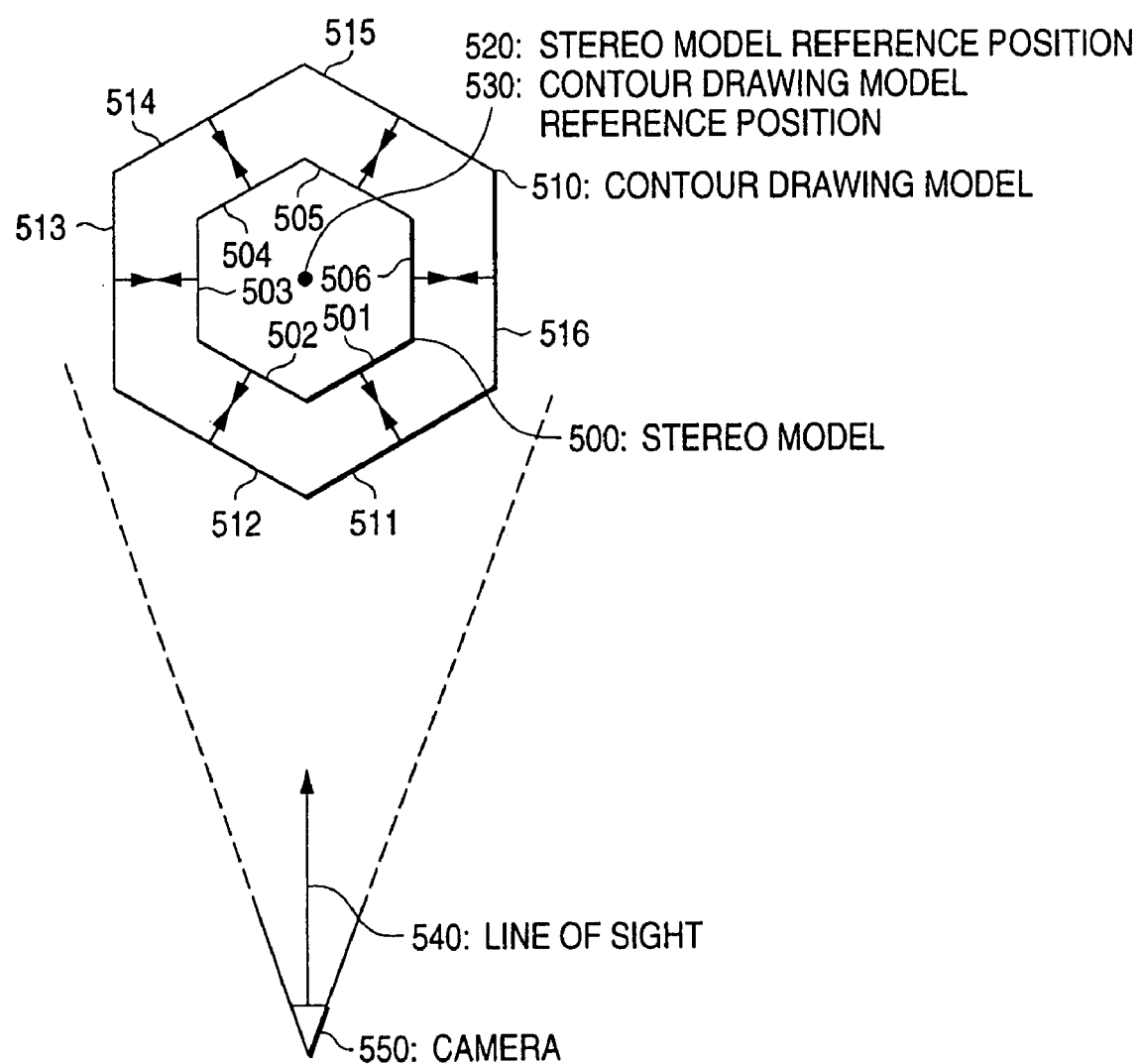
FIG. 4 is a schematic diagram for explaining positional relations among a camera, a stereo model and a contour drawing model in Embodiment 1, and shows the directions of the faces of the stereo model and the contour drawing model by arrows.

The reference position of this contour drawing model is usually defined to fall at or near that of the corresponding stereo model. For example, FIG. 4 shows the case in which a contour drawing model 510 is defined to have a larger size than that of a stereo model 500. In FIG. 4, the arrows of the individual planes indicate the face sides. The stereo model 500 has the faces on the outer sides of the individual planes of a hexagon, and the contour drawing model 510 has the faces on the inner sides of the individual planes of the hexagon.

Both a stereo model reference position 520 or the reference position of the stereo model 500 and a contour drawing model reference position 530 or the reference position of the contour drawing model 510 are defined at the center of the individual models. On the other hand, the contour drawing model 510 is defined to be larger on the contour drawing model reference position 530 than the stereo model 500.

A matrix is defined for translating the contour drawing model reference position 530 to the same position as the stereo model reference position 520. This matrix is contained in the contour drawing model arranging matrix. This contour drawing model arranging matrix is used to transform the coordinates of the vertexes of the polygon contained in the contour drawing model 510. As a result, the contour drawing model is arranged at the position containing the stereo model 500.

The contour drawing model processing unit 310 transforms the individual vertexes of the contour drawing model by using the arranging matrix which has been set by the contour drawing model by using the arranging matrix which has been set by the contour drawing model arranging matrix setting unit 305. On the other hand, the contour drawing model processing unit 310 decides whether the individual planes (e.g., the individual polygons) of the contour drawing model are directed to the face or the back with respect to the view point set in the virtual space. Here, the contour drawing model processing unit 310 does not calculate the brightness of the light to be reflected on the face of the contour drawing model. For example, the conversions to enlarge, reduce, rotate, translate or perspective-transform the vertexes are executed in accordance with the state designated in the virtual space or a virtual three-dimensional space. In addition, when a contour drawing model of the same size as that of the stereo model is acquired by the contour drawing model acquiring unit 300, the contour drawing model processing unit 310 executes the vertex conversions for enlarging the size of the contour drawing model. In this enlarging case, too, the stereo model and the contour drawing model relate to each other, as illustrated in FIG. 4.

And also, the side decision of a plane is made for eliminating such a plane from an object to be drawn as faces in the same direction as that of a line of sight 540 from a camera 550. In the example of FIG. 4, planes 511 and 512 near the camera 550 of the contour drawing model 510 are eliminated from the drawn object. Then, the planes outside of the stereo model 500 and near the camera 550 fail to belong to the drawn object so that the stereo model 500 is drawn as usual. Of the contour drawing model 510, on the other hand, only planes 513, 514, 515 and 516 at the back of the stereo model 500 belong to the drawn object. Since the hidden planes are erased by the hidden plane erasing unit 335 of the pixel processing unit 330, however, all the planes are not drawn even though they belong to the drawn object.

The blur expressing texture mapping unit 320 executes the operation to map the blur expressing texture on the contour drawing model so that the contour to be drawn may be resultantly blurred. This blur expressing texture will be exemplified hereinafter by the texture having a pattern containing a change in brightness or transparency. Here, the contours need not always be blurred so that the blur expressing texture mapping unit 320 is selectively operated.

The stereo model processing unit 340 processes the stereo model. Specifically, the stereo model processing unit 340 executes the vertex conversion (to enlarge, reduce, rotate, translate or perspective-transform) for each vertex of the contour draing model. The stereo model processing unit 340 also calculates the brightness of the light to be reflected on the surface of the stereo model. Moreover, the stereo model precessing unit 340 decides the sides of the individual planes (or the individual polygons) of the stereo model. Here, when the stereo model and the contour drawing model are of the same size, the stereo model processing unit 340 may execute a processing to reduce the size of the stereo model. By this size reduction of the stereo model, the size of the contour drawing model is made larger than that of the stereo model.

When the stereo model processing unit 340 performs the reducing operation, too, the stereo model 500 and the contour drawing model 510 relate to each other, as illustrated in FIG. 4. On the other hand, the side decision of the plane is made as in the contour drawing model processing unit 310 by eliminating such one of the planes of the stereo model from the drawn object as faces in the same direction as that of the sight line from the camera. In the example of FIG. 4, planes 503, 504, 505 and 506, as located at the back of the camera, are eliminated from the drawn object.

The pixel processing unit 330 operates to draw each pixel. For example, the pixel processing unit 330 determines the color of each pixel in the plane by interpolating the colors of the vertexes and determines the color of each pixel while executing the hidden plane erasing operation using the Z-buffer. The pixel processing unit 330 performs this operation for the planes which were drawn by the contour drawing model processing unit 310 and the stereo model processing unit 340.

In the case of FIG. 4, for example, what is drawn is the two planes 501 and 502, as the closest to the camera 550, of the stereo model 500 and the four planes 513, 514, 515 and 516, as the farthest from the camera 550, of the contour drawing model. These four planes of the contour drawing model 510 bulge out of the stereo model 500 to the right and left, as seen from the camera 550, so that only the bulging portions are neither hidden nor erased but are drawn. These bulging portions provide the contouring line. Here, the pixel processing unit 330 determines the color while considering the color of the material of the contour drawing model. Here, the color (e.g., a black or dark contouring color) of the contouring line may be adopted as that of the contour drawing model by ignoring that color of the material absolutely.

Here will be described the processing flow of Embodiment 1. Here, the following routine is executed such that the processing unit 103 (of FIG. 1) controls another component in the computer body 101.

[CD-R Recording Operation]

Figure 5:
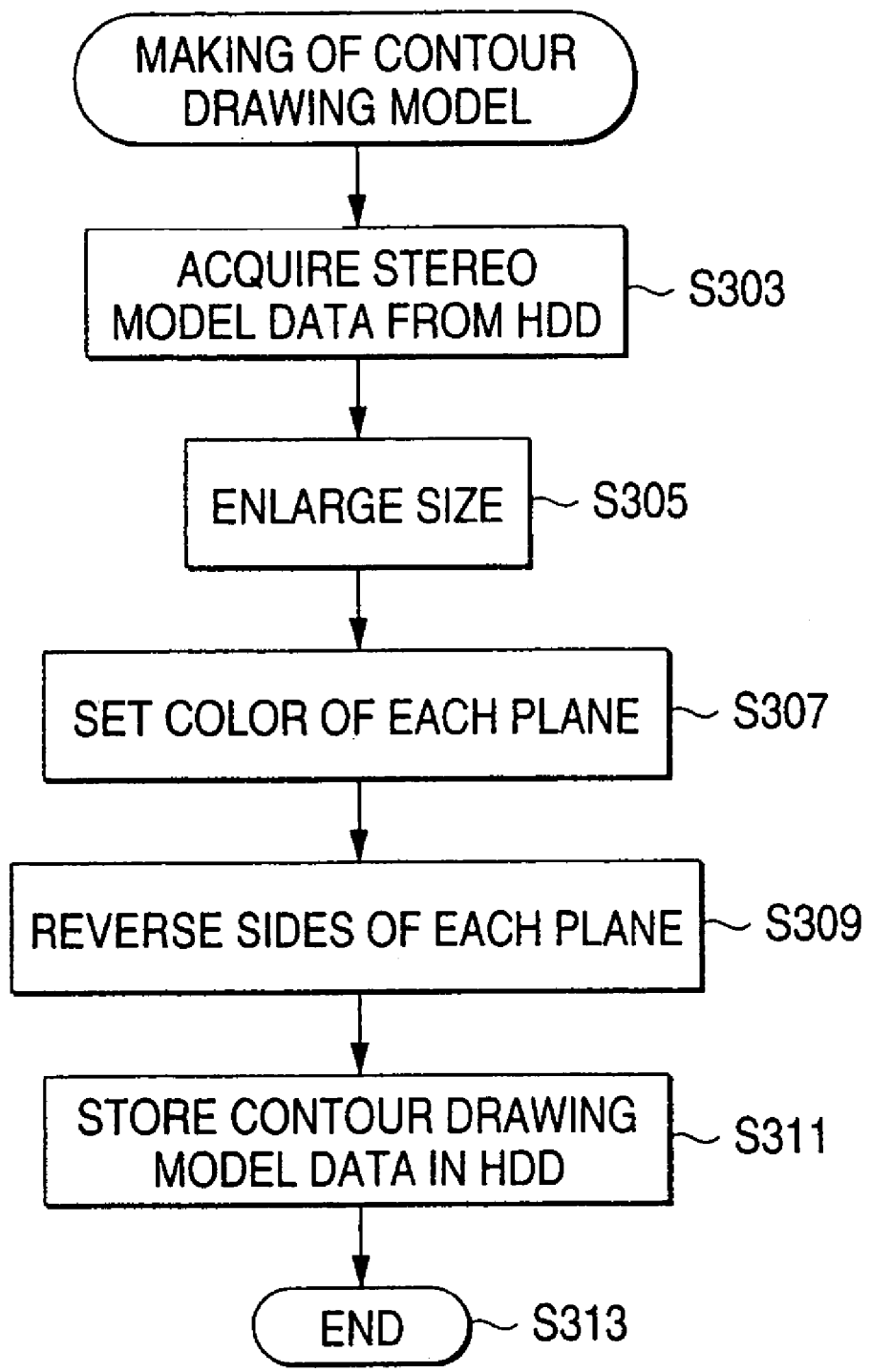
FIG. 5 is a flow chart of making a contour drawing model in Embodiment 1.

FIG. 5 shows a routine of making the contour drawing model in advance. When this routine is started, the stereo model data, as stored in advance in the HDD 107, are read out and acquired (at Step S303) as a target model to be converted.

Next, the size of this target model is enlarged (at Step S305). For example, the target model is enlarged in its entirety by about 2% by moving its individual vertexes in the normal directions by a length of 2% of the entire length of the target model. If the target model is exemplified by a human body having a height of about 1.8 m, more specifically, the individual vertexes are moved by a length corresponding to 0.036 m. At a higher enlargement ratio, the contouring line is drawn thick. When this enlargement ratio is so small that the target model is slightly enlarged, the contouring line is drawn thinner. If the enlargement is made not homogeneous but proportional, the contouring line of the more enlarged portion is exclusively drawn thick. This adjustment of size is usually performed by the producer of the stereo model so that the contouring line drawn can reflect the intention of the producer.

When the normals of the individual vertexes of the stereo model are not defined, the vertexes can also be moved in the normal directions by using the normals of the vertexes, as determined by interpolating the normals of the individual planes sharing the vertexes. On the other hand, those planes could also be moved in the normal directions of the individual planes of the stereo model. When the planes are simply moved, however, a clearance is left between the planes so that another operation for compensating the clearance is necessary. Since the stereo model is usually defined with a reference position, moreover, the individual vertexes of the corresponding target model can be moved around the reference position of the target model.

Next, the color of the material of each plane of the target model is set (at Step S507) to a color having an identical saturation but a lowered brightness. Here, each plane may be entirely set in a monochromatic color such as black. On the other hand, the setting may be made for mapping the blur expressing texture. The color of the material is adjusted by the producer so that the contouring line can be drawn in the color intended by the producer.

Next, the sides of each plane of the target model are reversed (at Step S309). Specifically, one of the orders defining the vertexes of the individual triangles constructing the target model is interchanged by another. This side deciding method will be described in detail.

The data of the target model thus far converted are stored as the contour drawing model data in the HDD 107 (at Step S311), and the contour drawing model making operation is ended (at Step S313).

Figure 6:
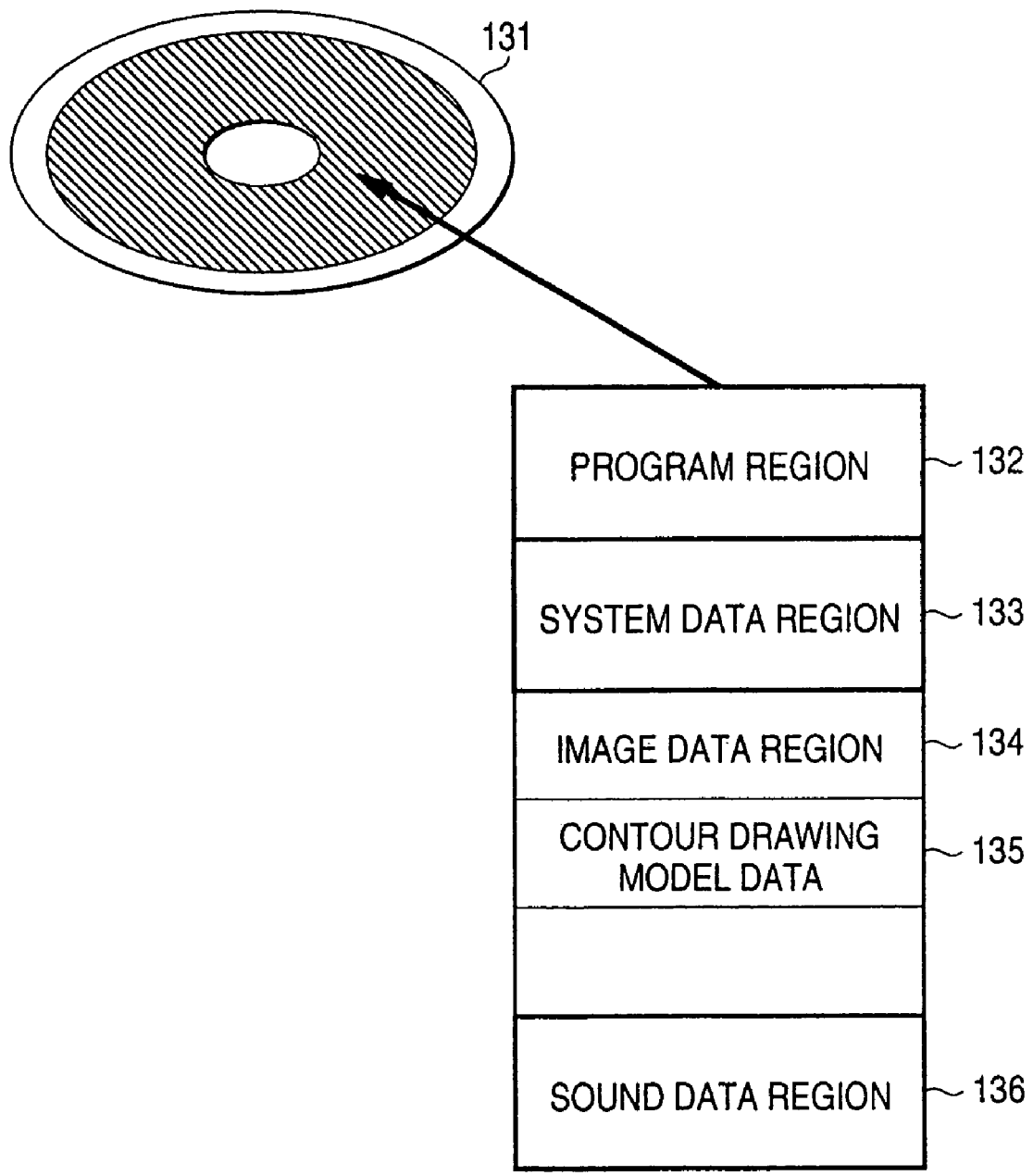
FIG. 6 is a schematic diagram showing an example of data written in CD-R 131.

Next, the various data, as stored in the HDD 107 to contain the contour drawing model data, are written from the CD-R drive 113 in the CD-R 131. FIG. 6 schematically shows an example of the data written in the CD-R 131.

A program region 132 is stored with the program for activating the computer 1000 to execute the invention. The program for executing the invention contains a processing program for preparing various data such as the contour drawing model data and for writing those data in the CD-R 131; and a processing program for displaying the stereo model or the like by using the various data such as the contour drawing model data. Thus, there may be excluded the program for writing the various data containing the contour drawing model data in the CD-R 131 by making the aforementioned contour drawing model. Thus, the routine shown in FIG. 7 can be executed by a computer which is provided unlike the computer 1000 with a CD-ROM drive in place of the CD-R drive 113.

A system data region 133 is stored with various data which are to be processed by the program stored in the aforementioned program region 132. An image data region 134 is stored with data containing contour drawing model data 135. When the contour drawing model is to be made in a later-described contour drawing model acquisition, however, the contour drawing model data 135 need not be stored. Here, the data for the stereo model and the texture for expressing a blur are also stored in the image data region 134.

A sound data region 136 is stored with data for causing the sound processing unit 109, as shown in FIG. 1, to output the sound from the sound output device 125. Here, this sound processing has no direct relation to the invention so that no data need be stored in the sound data region 136.

Here, the contour drawing model to be stored in the CD-R 131 may be defined to have the same size as that of the corresponding stereo model. In this case, after the contour drawing model was acquired by the later-described contour drawing model acquiring operation, it is enlarged by the time the arranging matrix of the contour drawing model is set by the later-described contour drawing model arranging operation. Alternatively, when the arranging matrix of the contour drawing model is set by the contour drawing model arranging operation, the arranging matrix may be so determined as to contain the enlarging conversion. When the stereo model is arranged, on the contrary, the arranging matrix of the stereo model may be so determined as to contain the reducing conversion.

On the other hand, the color of the material of each plane of the contour drawing model to be stored in the CD-R 131 may be identical to that of the material of each plane of the corresponding stereo model. In this case, the contour drawing model is drawn in the color, e.g., black, which has been separately defined at the time of the later-described contour drawing model drawing operation.

[Overall Processing Flow]

Figure 7:
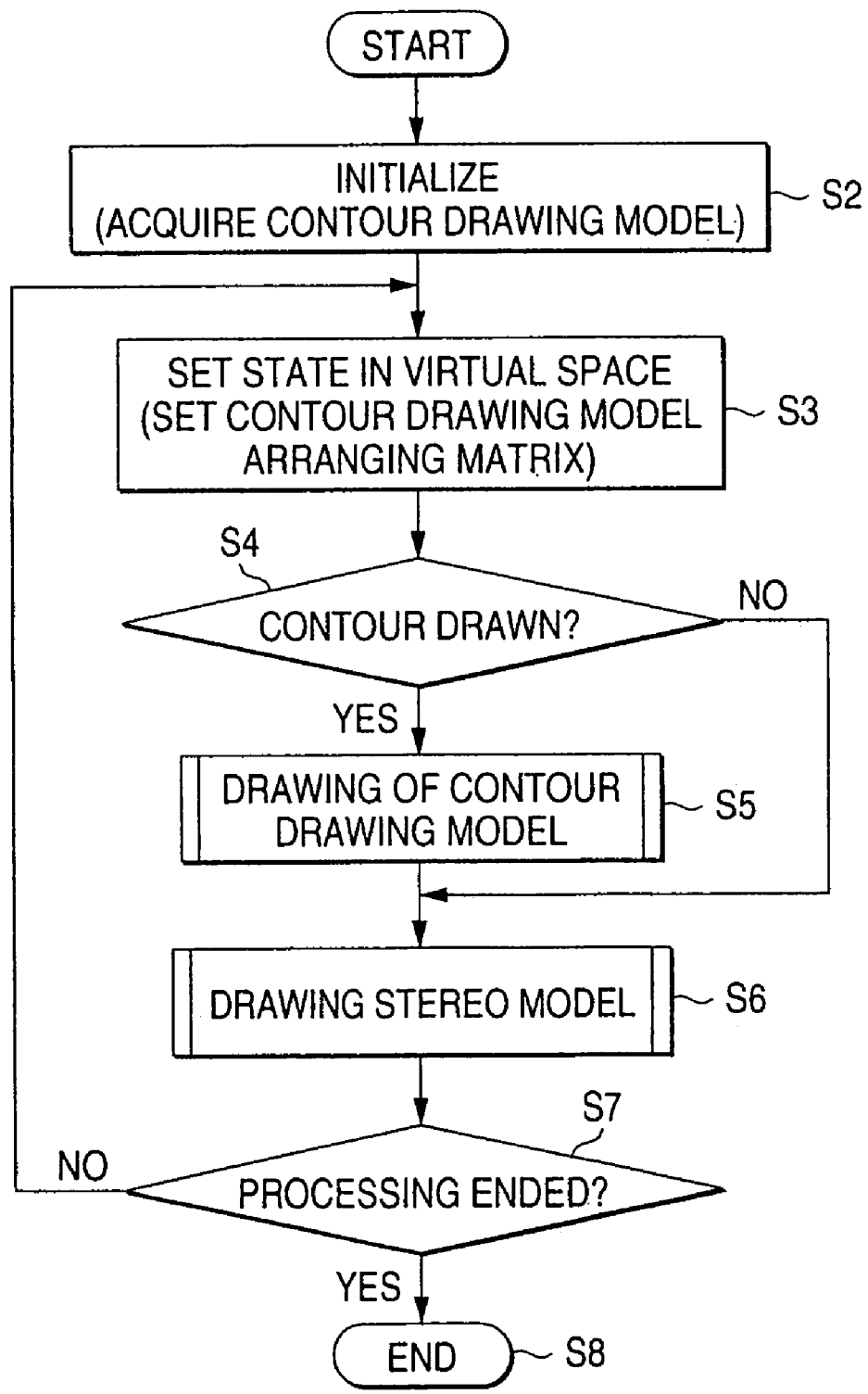
FIG. 7 is a flow chart showing exemplary overall processing of the invention.

FIG. 7 shows an overall processing flow of Embodiment 1. When the routine starts, it is initialized (at Step S2). This initialization contains a data acquisition (of FIG. 8) of the contour drawing model, as will be detailed, and a data acquisition of the stereo model to be drawn. Then, the state in the virtual space is set (at Step S3). This operation is to change the state in the virtual space accordingly as the position of a viewpoint is changed, as the position of the light source is changed, as the model is moved or as the model is deformed. After this operation, the positional coordinates, the direction, the enlargement ratio and the reduction ratio are determined. More specifically, the arranging matrixes (to be used in FIG. 10) of the stereo model and the contour drawing model are determined. By keying the input device (of FIG. 19), on the other hand, it is set at Step S3 whether or not the operation is to draw the contour of Step S4.

Next, it is decided (at Step S4) whether or not the contour is to be drawn. This decision is made on the basis of the setting by keying the input device 161 or by another program, as described hereinbefore. When it is decided to draw the contour, the operation to draw the contour drawing model is executed (at Step S5). This will be described later with reference to FIG. 10. No matter whether the contour might be drawn or not, the operation to draw the stereo model is executed (at Step S6). This operation will also be described later with reference to FIG. 14. These operations of Step S3 to Step S6 are repeatedly executed until the end of this routine (at Step S7). Whether or not the routine is to be ended is decided depending on whether or not the operation to end the routine has been input.

[Acquisition of Contour Drawing Model]

Figure 8:
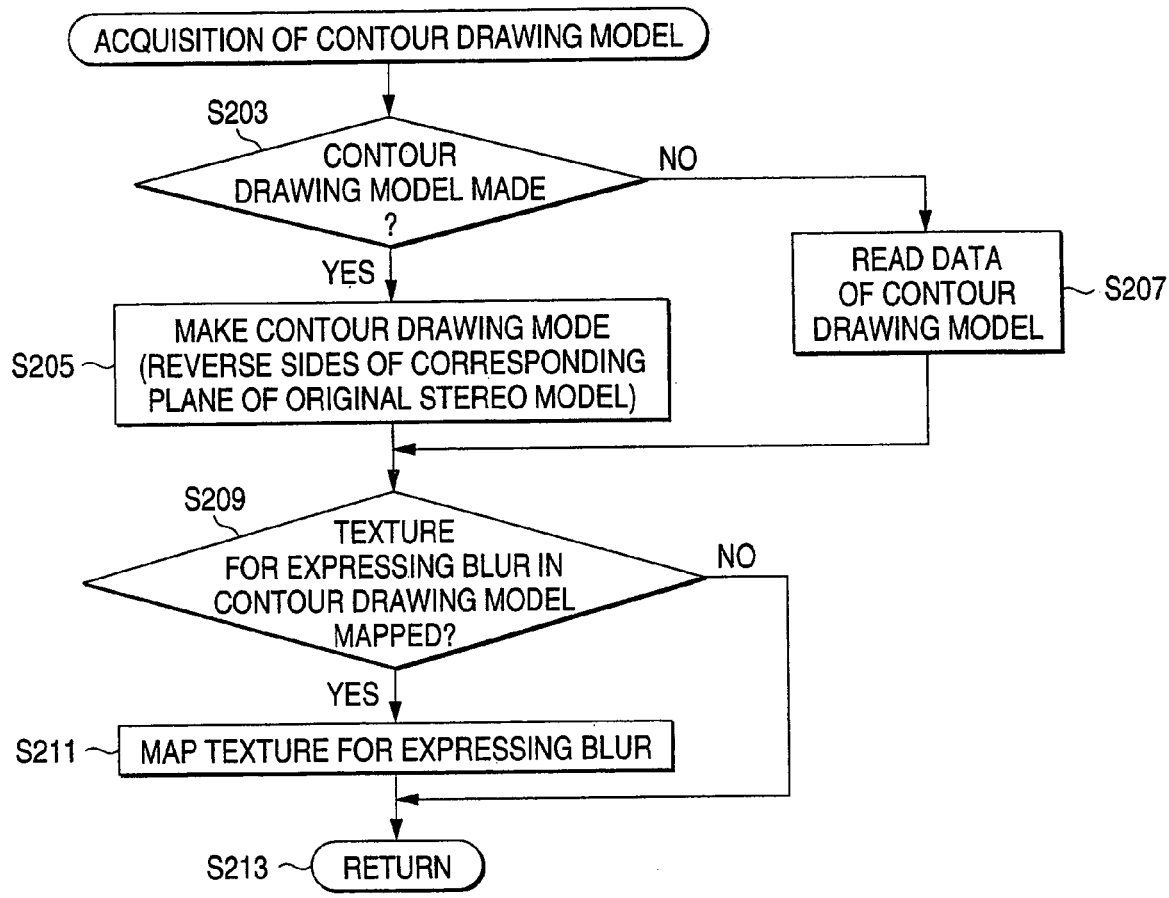
FIG. 8 is a flow chart of a contour drawing model acquisition of Embodiment 1.

FIG. 8 shows the acquisition of the contour drawing model. First, it is decided (at Step S203) whether or not the contour drawing model is to be made. This is because there are two cases in which the contour drawing model is prepared and in which the contour drawing model is made at this stage. This decision is made, for example, by deciding whether or not the contour drawing model corresponding to the stereo model is stored in the CD-R 131. It is decided not to make the contour drawing model, if it is decided that the contour drawing model is stored, but to make the contour drawing model if it is decided that the contour drawing model is not stored.

When it is decided that the contour drawing model is not made, there are read out (at Step S207) the data of the contour drawing model which are stored in the CD-R 131. Each plane of this contour drawing model has sides reversed from the corresponding plane of the stereo model, as has been described with reference to FIGS. 4 and 5. On the other hand, the contour drawing model to be read is defined to have a larger size than that of the corresponding stereo model. Moreover, the contour drawing model is defined to have a darker color than that of the corresponding stereo model.

If it is decided that the contour drawing model is to be made, the operation to make the contour drawing model is performed (at Step S205). When the contour drawing model is to be made at this stage, as at Step S207, each plane of the contour drawing model is reversed in its sides from the corresponding plane of the stereo model, as has been described with reference to FIG. 4.

The contour drawing model is made to have a larger size than that of the corresponding stereo model. As at Step S305 (of FIG. 5), the contour drawing model is enlarged by moving the individual vertexes of the stereo model in the normal directions of the vertexes. The contour is drawn thick, when the contour drawing model is larger than the stereo model, but is drawn thinner when the contour drawing model is significantly larger than the stereo model.

As has been described in connection with Step S305 (of FIG. 5), on the other hand, the enlarged contour drawing model may be made by moving the individual planes of the stereo model in the normal directions of the planes. Moreover, the contour drawing model, as enlarged by moving the individual vertexes of the stereo model, may be made around the reference position which is usually defined in the stereo model.

At this time, the contour drawing model may be made to have the same size as that of the corresponding stereo model. In this case, the contour drawing model is enlarged by the time the arranging matrix of the contour drawing model is set by the later-described contour drawing model arranging operation after the contour drawing model was acquired by this contour drawing model acquiring operation. Alternatively, the contour drawing model arranging matrix may be determined to contain the enlarging conversion when it is set by the contour drawing model arranging operation. When the stereo model is to be arranged, on the contrary, the stereo model arranging matrix may be so determined as to contain the reducing conversion.

On the other hand, the color of the material of each plane of the contour drawing model is made darker than that of the material of each plane of the corresponding stereo model. At this time, as has been described in connection with Step S307 (of FIG. 5), the color of the contour drawing model to be made need not be defined. Alternatively, the color of the material of each plane of the contour drawing model may be identical to that of the material of each plane of the corresponding stereo model. In this case, the color of the contour drawing model is not considered at the time of drawing the contour drawing model, but the contour drawing model is drawn either in the separately defined color such as black or in the color of the texture for expressing the blur.

Next, it is decided (at Step S209) whether or not the texture for expressing the blur in the contour drawing model is to be mapped. When the contour drawing model is made at Step S205, that decision is made on the basis of the data of the corresponding stereo model. When the contour drawing model was read out at Step S207, on the other hand, that decision is made on the basis of the data of the contour drawing model read out. When it is decided that the texture for expressing the blur is to be mapped, the texture for expressing the blur in the contour drawing model is mapped at Step S211. In short, texture coordinates (U, V) are set at the individual vertexes of the polygon.

Figure 9:
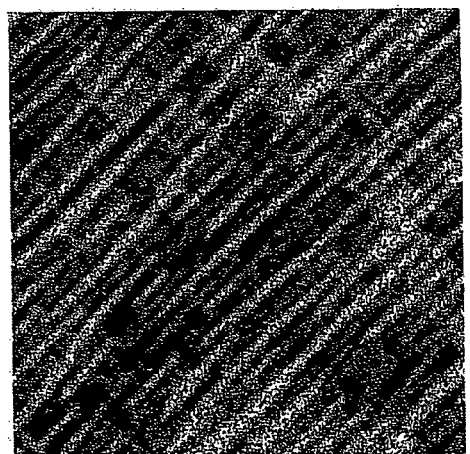
FIG. 9 shows one example of a texture for expressing a blur.

As also described, the texture for expressing the blur has a pattern containing changes in brightness or transparency. FIG. 9 illustrates one example of the texture containing the changes in brightness. This texture has a pattern of fine white oblique lines on a black background. The black portion has a low brightness whereas the white portion has a higher brightness so that the texture of FIG. 9 has the changes in brightness.

In this embodiment, a portion of the contour drawing model is displayed as the contour portion of the stereo model. When the contour drawing model having the texture of FIG. 9 mapped is to be drawn as the contour, the line corresponding to the line to be cut as the contour from the contour drawing model is cut out of the texture and drawn. If the line is then cut generally longitudinally or transversely from that texture, any line contains the changes in brightness. Thus, the line is drawn as the contour so that the drawn contour contains the changes in brightness. In other words, the drawn contour has a blurred expression as if it were handwritten.

In the texture presented in FIG. 9, the line contains the changes in brightness no matter what direction it might be cut in. Depending on the cutting direction, however, the brightness hardly changes. The position and the direction of the contour drawing model to be drawn as the contour can be adjusted so that the texture for expressing the blur is adjusted in its pattern mainly depending upon the cutting direction.

When the contour is drawn with the contour drawing model in which the texture having a pattern containing the changes in transparency is mapped, it contains the changes in transparency. The portion of high transparency is drawn in a color accordingly near that of the background, and the portion of low transparency is drawn in a color such as black accordingly far from that of the texture. As a result, the contour is drawn with changes in density and with the blur.

When it is decided that the texture for expressing the blur is not mapped and when the operation to map the texture is ended, the processing unit 103 ends the contour drawing model acquiring operation (at Step S213).

[Contour Drawing Model Arrangement]

At Step S3 of FIG. 7, the arranging matrix of the contour drawing model is set to arrange the contour drawing model. The reference position of the contour drawing model is usually located at a position corresponding to the reference position of the stereo model. Moreover, the contour drawing model arranging matrix is so set that it is arranged at or near the reference position of the stereo model.

When the direction of the stereo model changes, the contour drawing model is also accordingly set with the arranging matrix containing the rotating conversion. When the stereo model changes in shape, the contour drawing model is accordingly deformed.

When the contour drawing model has the same size at this stage as that of the corresponding stereo model, it is enlarged. Specifically, the arranging matrix of the contour drawing model is so set that the individual vertexes of the contour drawing model may be enlarged around the reference position of the contour drawing model at a predetermined enlargement ratio. Alternatively, the stereo model may be reduced. In this case, more specifically, the arranging matrix of the stereo model is so set that the individual vertexes of the stereo model may be reduced around the reference position of the stereo model at a predetermined reduction ratio.

Thus, the relatively large contour drawing model is finally arranged to contain the stereo model. Depending upon the relations in the arrangement positions, directions and shapes between the two models, however, the contour drawing model may fail to contain the stereo model completely. In this case, however, the contour is drawn for the contained portion.

Here, the arranging matrix need not always be set at this stage, but there may be fixed individual components necessary for the conversions of vertexes such as the coordinates, the directions, or the enlargement or reduction ratio. In this case, too, the actual vertex conversions are made at the stage of drawing the individual models.

[Drawing of Contour Drawing Model]

Figure 10:
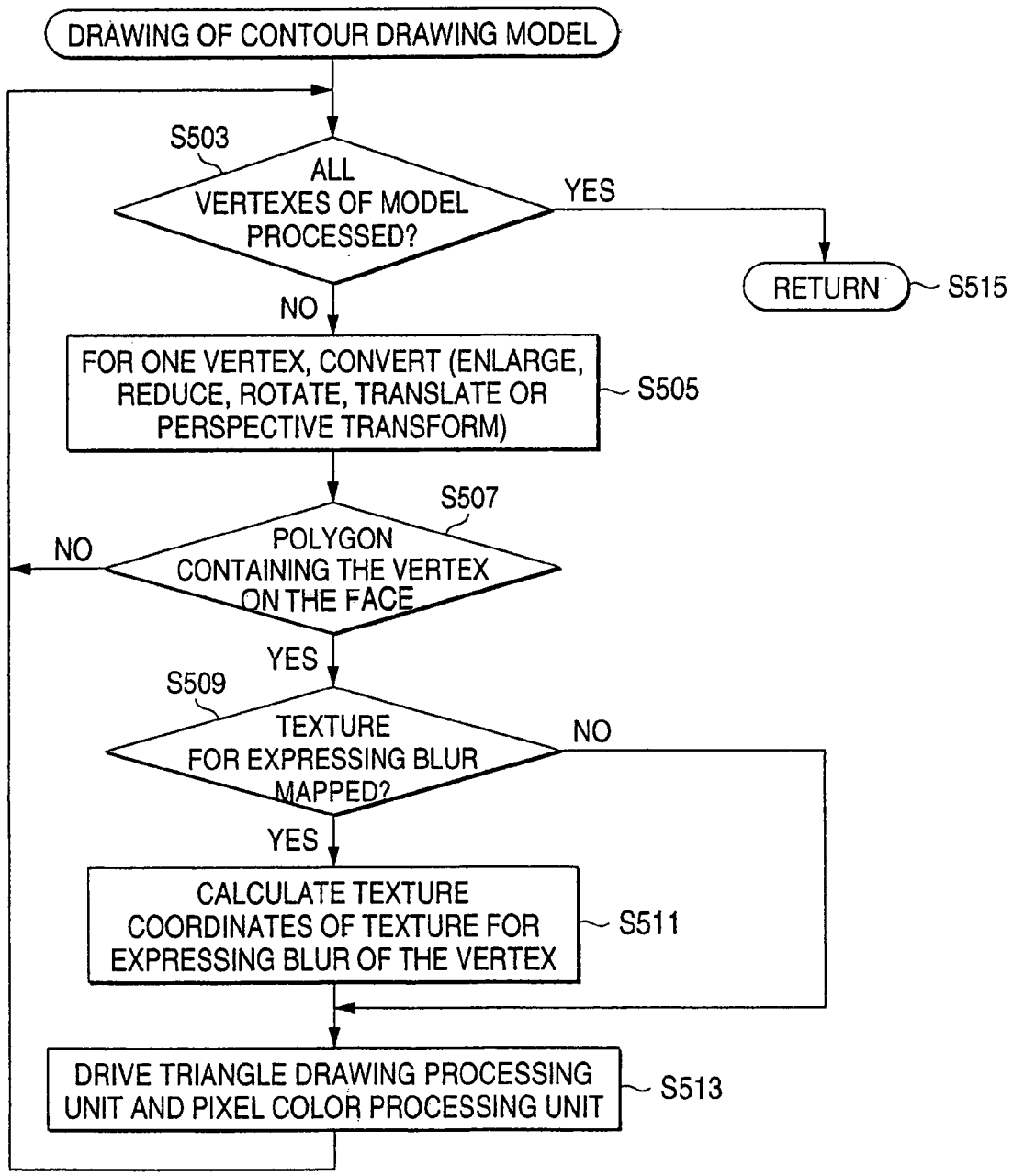
FIG. 10 is a flow chart of drawing a contour drawing model of Embodiment 1.

In FIG. 10 showing a flow of drawing the contour drawing model, the following operations are repeated (at Step S503) until all the vertexes of the contour drawing model are processed. The first one of the repeated operations is to convert (enlarge, reduce, rotate, translate, or perspective transform) each vertex (at Step S505). Here the arranging matrix which was determined at Step S3 is used for the vertex conversion.

For example, this operation is executed by the geometric operation unit 205 which is commanded by the processing unit 103. What should be noted here is that the geometric operation unit 207 does not execute the light source location for the contour drawing model. This is because the contour is drawn independently of the location of the light source so that the location is of no use. Usually, this vertex conversion is made on the basis of the state which is designated in the virtual three-dimensional space. If the contour drawing model has the same size as that of the stereo model, however, it may be enlarged at this stage in accordance with the arranging matrix set at the arranging operation.

Figure 11:
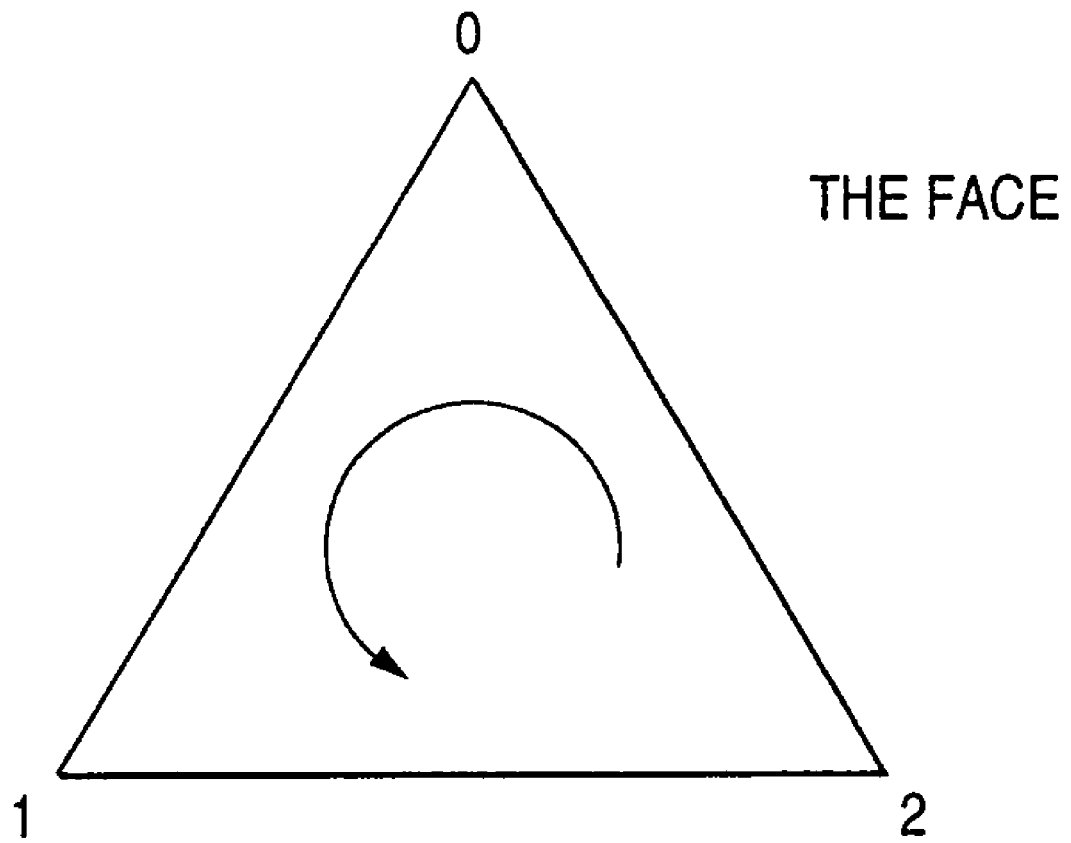
FIG. 11 is a schematic diagram for explaining a decision of the sides of a triangular polygon.

Then, it is decided (at Step S507) whether the polygon (or plane) containing the noticed vertex is on the face or back. This decision is made for the triangular polygon in dependence upon what direction the triangular polygon composed of two vertexes processed before that vertex faces in. FIG. 11 illustrates an example of the triangular polygon composing the stereo model so as to explain the decision of the sides. In this example: the upper vertex is designated by numeral 0; the lower lefthand vertex is designated by numeral 1; and the lower righthand vertex is designated by numeral 2. In short, the vertexes are numbered counter-clockwise from the upper vertex.

In Embodiment 1, the plane, as seen to have the vertexes of the triangular polygon numbered counter-clockwise, is defined as the face (i.e., the so-called "right-hand system"). Therefore, the triangular polygon of FIG. 11 has the face placed on this side. With the normal vector being in the direction of the face plane, the sides of the triangular polygon can be decided with the inner product of the normal vector and the sight line vector. Specifically, this side faces the viewpoint, if the sign of the inner product is negative, and is at the back of the viewpoint if the sign of the inner product is positive.

Figure 12A:
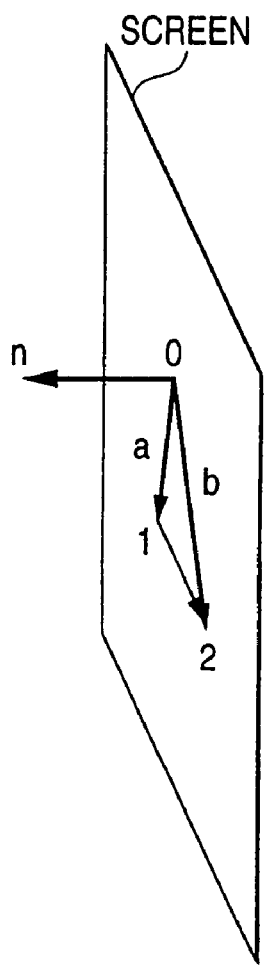
FIG. 12A is a schematic diagram (of the face case) for explaining a method of deciding the sides.
Figure 12A:
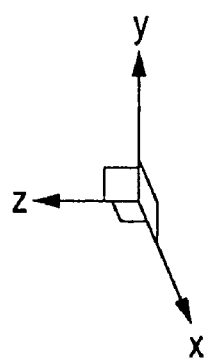
Figure 12B:
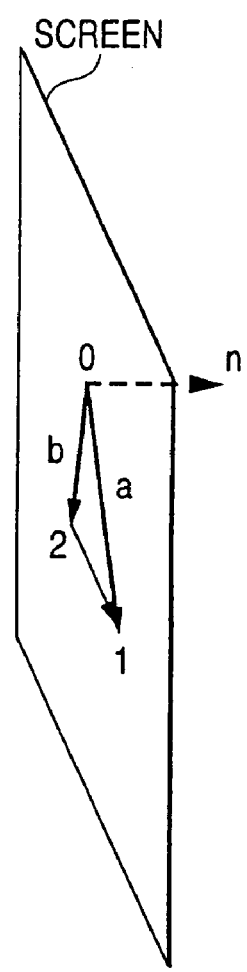
FIG. 12B is a schematic diagram (of the back case) for explaining the method of deciding the sides.
Figure 12B:
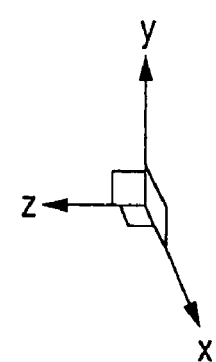

FIGS. 12A and 12B are schematic diagrams illustrating the method of deciding the sides. As a matter of fact, as shown in FIGS. 12A and 12B, an outer product of a×b is calculated between the vector a from the vertex 0 produced on the screen to the vertex 1 and the vector b from the vertex 0 projected on the screen to the vertex 2, and whether or not the side is the face is decided in terms of the direction of a vector n or the result of the outer product. This vector n is parallel to the z-axis so that whether or not the side is the face is decided by inspecting the sign of the z-component of the vector n. That is, the positive value indicates the face, and the negative value indicates the back. In FIG. 12A, the vertexes of the triangle are numbered counter-clockwise, and the vector n or the result of the outer product is in the positive direction of the z-axis so that the side is the face. In FIG. 12B, on the contrary, the vertexes of the triangle are numbered clockwise, and the vector n or the result of the outer product is in the negative direction of the z-axis so that the side is the back.

Figure 13:
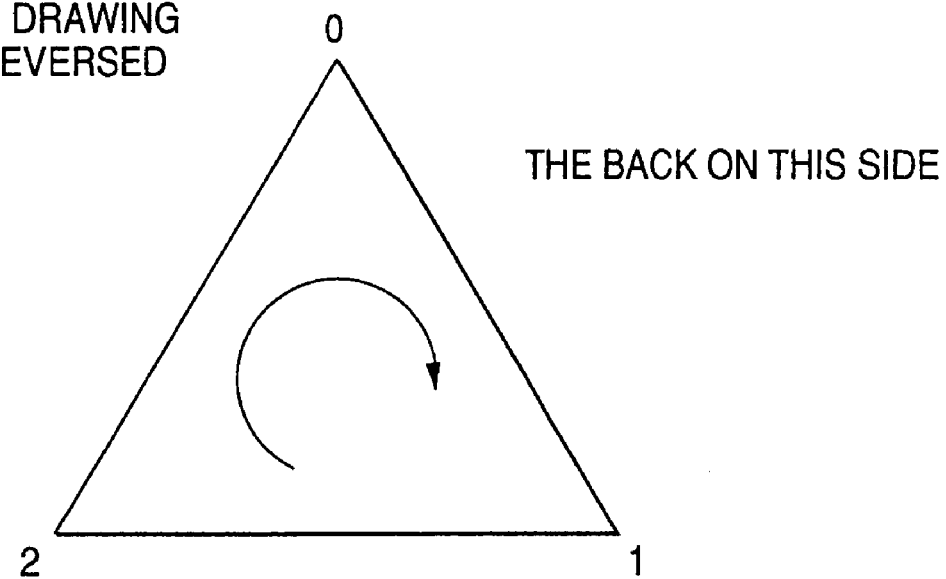
FIG. 13 is a schematic diagram for explaining the side decision of the triangular polygon in Embodiment 1.

In the case of the contour drawing model of Embodiment 1, the planes of the contour drawing model are reversed in sides from the corresponding planes of the stereo model. FIG. 13 shows a polygon corresponding to the polygon of FIG. 11 but having the reversed sides. The individual vertexes of the triangular polygon shown in FIG. 13 are numbers by the numerals 0, 1 and 2 in the order of the upper, righthand lower and the lefthand lower vertexes. In short, the corresponding triangular polygon has the vertexes numbered in the inverted order. Therefore, it is decided in FIG. 13 that this side is the back. In Embodiment 1, the sides are decided at this stage, but the decision could be made beforehand.

If the polygon (or its plane) containing that vertex is the back, the routine returns to Step S503. If the polygon (or its plane) containing the vertex is the face, it is decided (at Step S509) whether or not the texture for expressing the blur is to be mapped.

This implies the texture mapping of the polygon. When the texture for expressing the blur is to be mapped, the texture coordinates of the texture for expressing the blur for that vertex are calculated (at Step S511). In the case of the texture mapping, the texture coordinates (U, V) have already been designated to the vertexes of the polygon. If this polygon is arranged obliquely with respect to the screen, the texture may be displayed with a distortion on the screen. In order to avoid this distortion, there is executed the texture perspective processing. In this texture perspective processing, for example, Q=1/w (where letter w indicates the depth from the screen) is used to calculate new texture coordinates (S,V). These S and V values can be calculated by S=UxQ and T=VxQ. The calculated coordinates (S, V) are set as the texture coordinates corresponding to the vertexes of the polygon.

Then, there are driven (at Step S513) the triangle drawing processing unit 205 and the pixel color processing unit 209. As described above, the triangle drawing processing unit 205 generates the data of the individual pixels in the triangular polygon by interpolating the data of the individual vertexes of the triangular polygon. The data of the individual vertexes are the color of the material, the screen coordinate values, and the texture coordinate values if the operation of Step S511 is executed. The data at the individual pixels are the color of the material and the pixel colors if the operation of Step S511 is executed.

At this time, however, each vertex can be set with the color of the contour while ignoring the color of the material. Considering the color of the material, on the other hand, the brightness could be set. The pixel color processing unit 209 writes the display image in the frame buffer 213 by using the data at the individual pixels in the triangular polygon generated by the triangle drawing processing unit 205. At this time, the hidden plane erasure is performed by using the Z-buffer 211.

For this hidden plane erasure, the example uses the Z-buffer 211. For the simple model shown in FIG. 4, however, there may be executed a hidden plane erasure such as the Z-sorting method using the Z-buffer. In a more complicated model where the hand of a human body is arranged ahead of the trunk, however, it is difficult to draw the contour precisely unless the hidden plane erasure using the Z-buffer is performed.

[Drawing of Stereo Model]

Figure 14:
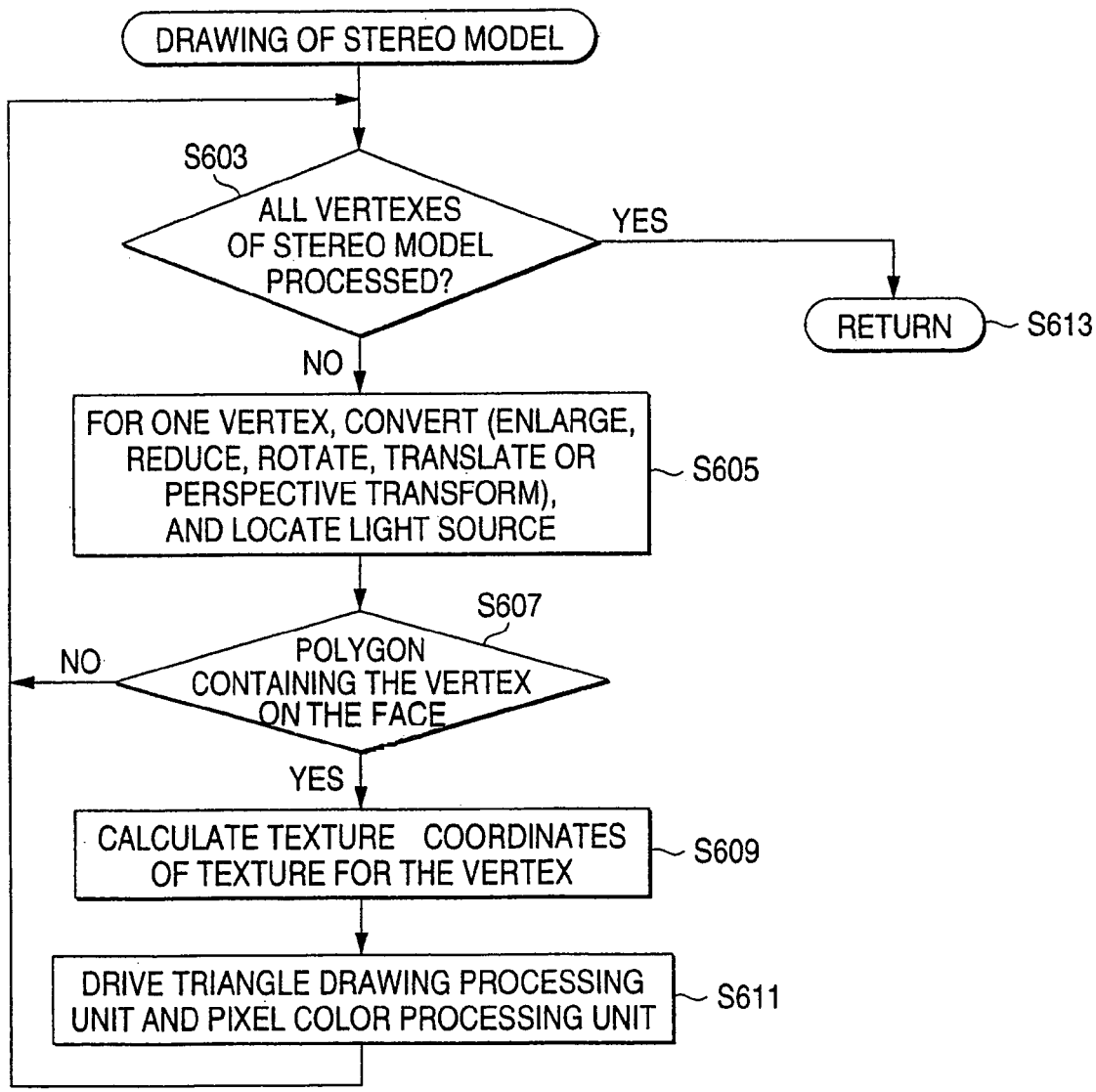
FIG. 14 is a flow chart of drawing a stereo model in the embodiment.

FIG. 14 shows a flow of drawing a stereo model, as common between Embodiment 1 and later-described Embodiment 2. Here are repeated the following operations until all the vertexes of the stereo model are processed (at Step S603). The first one of the repeated operations is to convert (enlarge, reduce, rotate, translate, or perspective transform) each vertex, and to locate the light source (at Step S605). This operation is executed by the geometric operation unit 207, for example, in response to the command from the processing unit 103. The data of the stereo model are stored in the CD-R 131, for example.

The enlarging, reducing, rotating, translating and perspective transforming operations are fundamentally based on the state, as set in the virtual space at Step S3 of FIG. 7. When the contour drawing model has the same size as that of the stereo model, however, the contour drawing model may be relatively enlarged by reducing the size of the stereo model. In this case, the reducing conversion is executed at Step S605. Here, this reduction can be simplified by moving the individual vertexes in their normals toward the center of the stereo model. Here, the perspective transformation is to transform the coordinate values of the individual vertexes of the polygon of the universe coordinate system into those in the screen coordinate system. On the other hand, the light source location is made by calculating the shade (or brightness) which is produced by the virtual light emitted from the light source.

Next, it is decided (at Step S607) whether or not the polygon containing the noticed vertex has its surface directed to the camera. This decision is made depending upon what direction the triangular polygon composed of the two processed vertexes processed before that vertex faces in the case of the triangular polygon. This decision can employ the method which has been explained in connection with the drawing operation of the contour drawing model. In Embodiment 1, the side decision is made at this stage but could be made before the stage.

If the polygon (or plane) containing that vertex is the back, the routine returns to Step S603. If the polygon (or plane) containing that vertex is the face, the texture coordinates of the vertex are calculated (at Step S609). In the case of the texture mapping operation, the texture coordinates (U, V) have already been designated to the vertexes of the polygon. Here is performed as the texture perspective processing the calculations of $S=U \times Q$ and $T=V \times Q$ by using $Q=1/w$ (where letter w indicates the depth from the screen).

Figure 2:
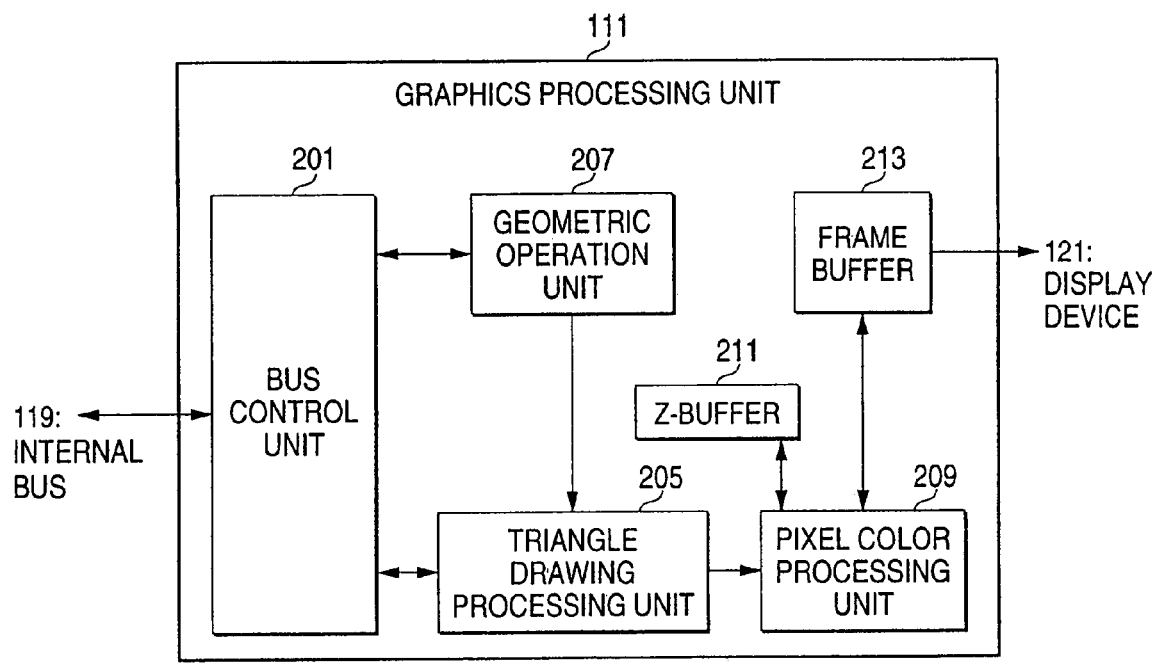
FIG. 2 is a block diagram showing one example of a graphics processing unit of FIG. 1.

Then, there are driven (at Step S611) the triangle drawing processing unit 205 and the pixel color processing unit 209, as shown in FIG. 2. As described above, the triangle drawing processing unit 205 generates the data of the individual pixels in the triangular polygon by interpolating the data of the individual vertexes of the triangular polygon. The data of the individual vertexes are the color of the material, the screen coordinate values, and the texture coordinate values. The data at the individual pixels are the color of the material and the pixel colors. The pixel color processing unit 209 writes the display image in the frame buffer 213 by using the data at the individual pixels in the triangular polygon generated by the triangle drawing processing unit 205. At this time, the hidden plane erasure is performed by using the Z-buffer 211.

By executing the operations thus far described, the stereo model is rendered as usual. The contour drawing model, as introduced in Embodiment 1, is drawn at the portion which is at the back of the stereo model but is not hidden by the stereo model, so that the portion is rendered as the contour. In Embodiment 1, the contour can be simply drawn for operations substantially similar to those for the ordinary stereo model merely by introducing the contour drawing model.

Embodiment 2

Figure 15:
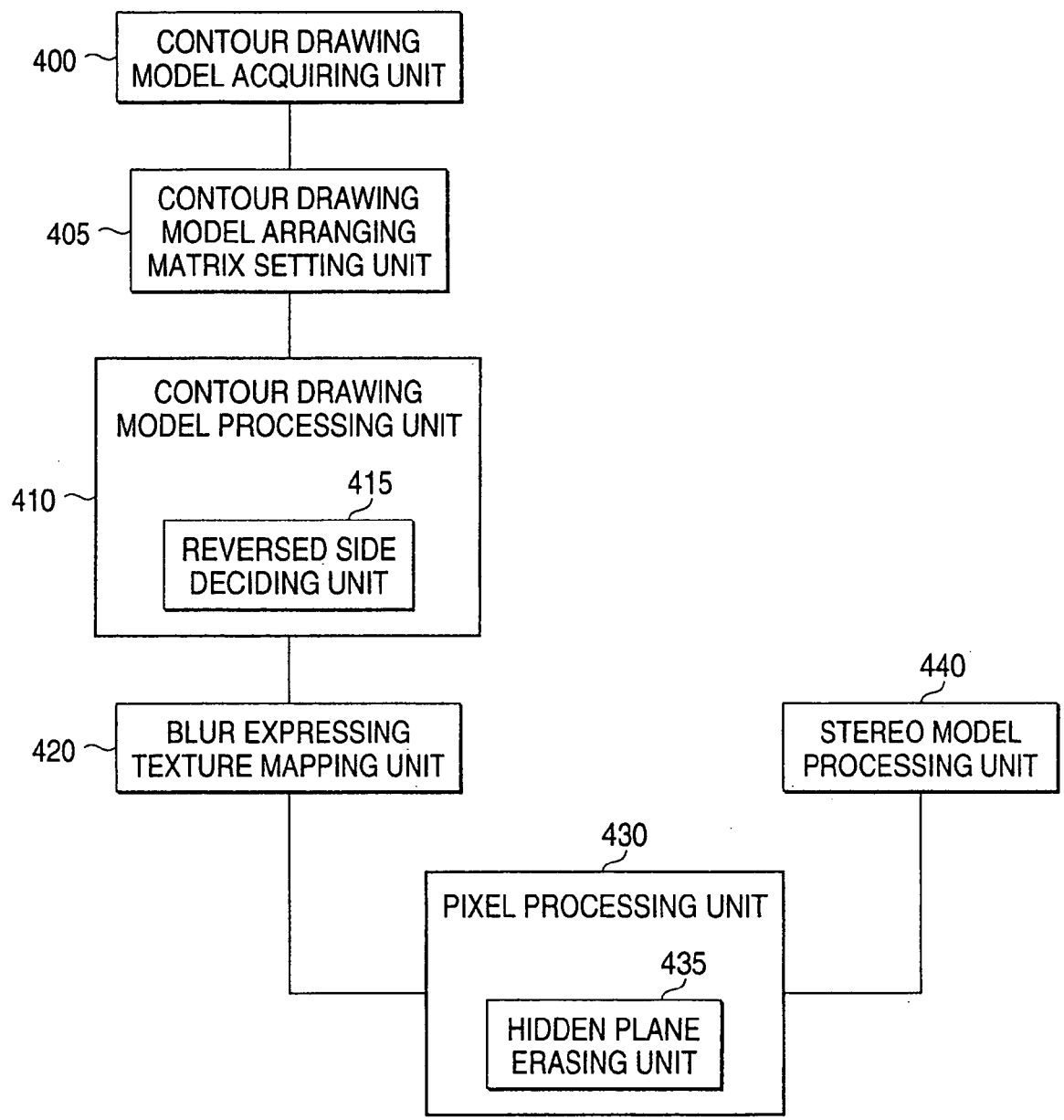
FIG. 15 is a functional block diagram of Embodiment 2.

Embodiment 2 of the invention will be schematically described with reference to the functional block diagram of FIG. 15. a rendering device, as shown as Embodiment 2, includes a contour drawing model acquiring unit 400, a contour drawing model arranging matrix setting unit 405, a contour drawing model processing unit 410 having a reversed side deciding unit 415, a blur expressing texture mapping unit 420, a pixel processing unit 430 having a hidden plane erasing unit 435, and a stereo model processing unit 440.

The contour drawing model acquiring unit 400 makes a contour drawing model corresponding to a stereo model formed of a triangular polygon, for example. When the contour drawing model is made in advance, on the other hand, the contour drawing model acquiring unit 400 reads the contour drawing model formed of the triangular polygon, which has been made in advance. Here, each plane of the contour drawing model acquired is reversed in sides from the corresponding plane of the stereo model. In Embodiment 2 unlike Embodiment 1, each plane of the contour drawing model to be acquired has the same face and back as those of the corresponding plane of the stereo model. On the other hand, the contour drawing model is made larger than the stereo model and is defined by predetermined contouring colors. Here, the contour drawing model has to be finally made larger than the corresponding stereo model but may be as large at this stage as the stereo model. In this case, the contour drawing model is so processed as to be drawn larger than the stereo model by the time the two models are drawn.

Figure 16:
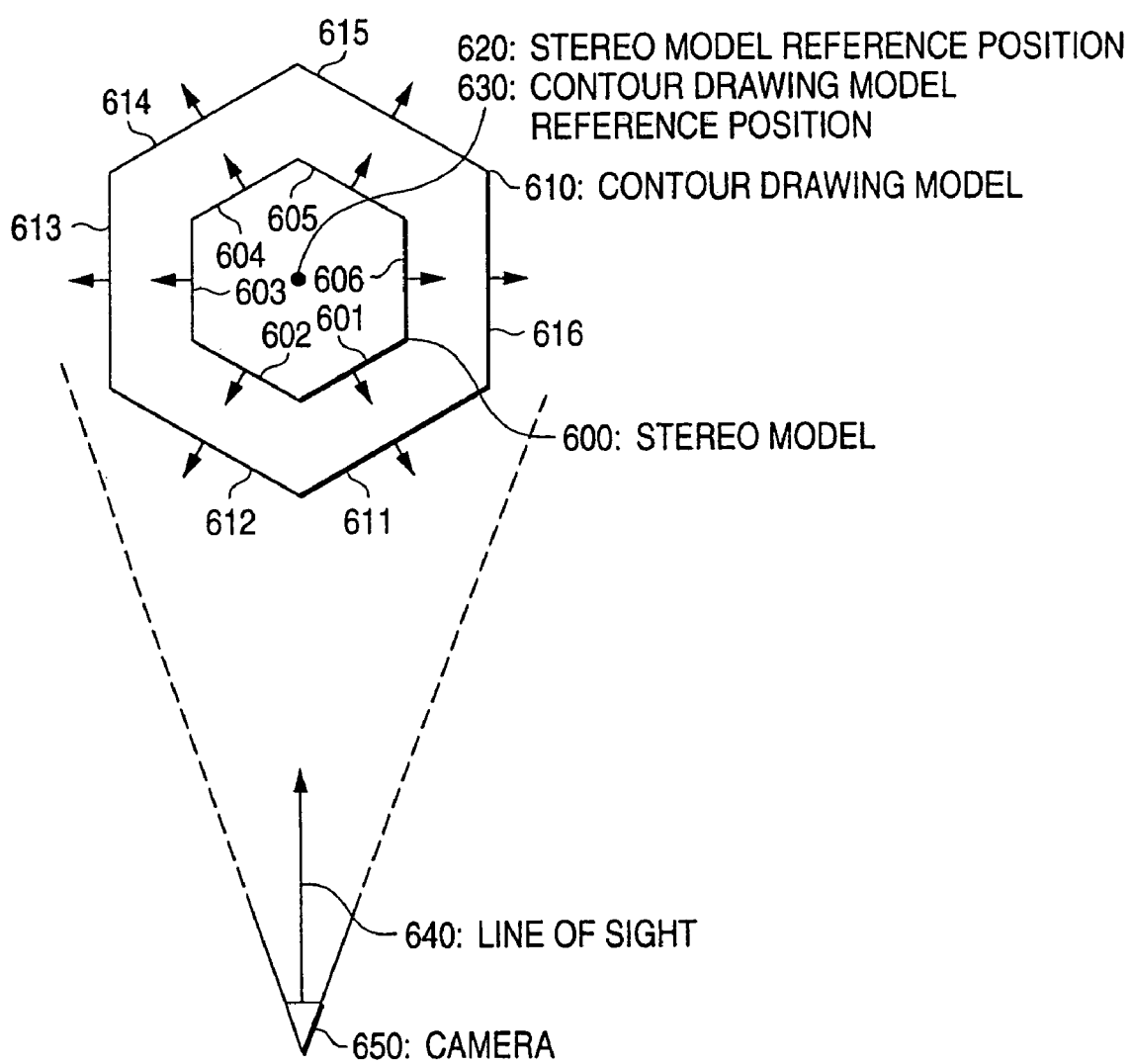
FIG. 16 is a schematic diagram for explaining positional relations among a camera, a stereo model and a contour drawing model in Embodiment 2, and shows the directions of the faces of the stereo model and the contour drawing model by arrows.

And also, the colors of the contour drawing model may succeed to those of the corresponding stereo model as they are. In this case, the drawing colors are separately—designated. The reference position of this contour drawing model is usually defined to fall at or near that of the corresponding stereo model. For example, FIG. 16 shows the case in which a contour drawing model 610 is defined to have a larger size than that of a stereo model 600. In FIG. 16, the arrows of the individual planes indicate the face sides. Not only the stereo model 600 but also the contour drawing model 610 have the faces on the outer sides of the individual planes of a hexagon, and the contour drawing model 510 has the faces on the inner sides of the individual planes of the hexagon.

Both a stereo model reference position 620 or the reference position of the stereo model 600 and a contour drawing model reference position 630 or the reference position of the contour drawing model 610 are defined at the center of the individual models. On the other hand, the contour drawing model 610 is defined to be larger on the contour drawing model reference position 630 than the stereo model 600.

Moreover, the contour drawing model arranging matrix setting unit 405 (of FIG. 15) sets an arranging matrix for arranging the contour drawing model reference position 630 in a virtual space at the same position as the stereo model reference position 620. This arranging matrix is used to convert such as translate, rotate, enlarge or reduce each vertex of the corresponding model. By setting the arranging matrix of the contour drawing model 610 to contain such a conversion as to translate the contour drawing model reference position 630 in the coordinates of the stereo model reference position 620, more specifically, the contour drawing model 610 is arranged at a position containing the stereo model 600.

The contour drawing model processing unit 410 executes the vertex conversion (to enlarge, reduce, rotate, translate or perspective-transform) for each vertex of the contour drawing model and the decisions of the sides of the individual planes (or the polygon) of the contour drawing model. Unlike Embodiment 1, however, the side decisions are made by the reversed side deciding unit 415. Here, there is not executed the location of the light source. For example, the conversions to enlarge, reduce, rotate, translate or perspective-transform the vertexes are executed in accordance with the state designated in the virtual space or a virtual three-dimensional space. In addition, when a contour drawing model of the same size as that of the stereo model is acquired by the contour drawing model acquiring unit 400, the contour drawing model processing unit 410 executes the vertex conversions for enlarging the size of the contour drawing model. In this enlarging case, too, the stereo model and the contour drawing model relate to each other, as illustrated in FIG. 16.

In Embodiment 2, there are inverted the decision standards for deciding the face and back of each plane of the contour drawing model. Let the case be considered, in which the vertexes of each polygon are numbered counter-clockwise, as the face of the polygon is viewed from the camera, for example, as shown in FIG. 11. In the face/back decision of this case for a model other than the contour drawing model, the polygon is decided to face the camera, if the vertex numbers are given counter-clockwise when the polygon is viewed from the camera. In the face/back decision for the counter drawing model, on the other hand, the polygon is decided to face the camera, if the vertex numbers are given clockwise when the polygon is viewed from the camera. In the example of FIG. 16, therefore, only planes 613, 614, 615 and 616, as indicated by arrows in the same direction as a line of sight 540 from a camera 650, are made to fall under the drawn object. These planes are usually on the backs so that they do not fall under the drawn object, but are handled as the drawn object in Embodiment 2. Then, planes 611 and 612 outside of the stereo model 600 and near the camera 650 fail to belong to the drawn object so that the stereo model 600 is drawn as usual. Since the hidden planes are erased by the hidden plane erasing unit 435 of the pixel processing unit 430, however, all the planes are not drawn even though they belong to the drawn object.

The blur expressing texture mapping unit 420 executes the operation to map the blur expressing texture on the contour drawing model so that the contour to be drawn may be resultantly blurred. Here, the contours need not always be blurred so that the blur expressing texture mapping unit 420 is selectively operated.

The stereo model processing unit 440 processes the stereo model. Specifically, the stereo model processing unit 440 executes the vertex conversion (to enlarge, reduce, rotate, translate or perspective-transform) and the location of the light source for each vertex of the stereo model, and the decisions of the sides of the individual planes (or the polygon) of the stereo model. When not only the conversions to enlarge, reduce, rotate, translate or perspective-transform the vertexes are executed in accordance with the state designated in the virtual three-dimensional space but also the contour drawing model processed by the contour drawing model processing unit 410 is as large as the stereo model, the stereo model processing unit 440 executes the vertex conversion to reduce the size of the stereo model so that the stereo model may be smaller than the contour drawing model. In this reducing case, too, the stereo model and the contour drawing model relate to each other, as illustrated in FIG. 16.

On the other hand, the side decision of the plane is made as usual, i.e., contrary to that of the contour drawing model processing unit by eliminating such one of the planes of the stereo model 600 from the drawn object as indicated by arrows in the same direction as that of the sight line 640 from the camera 650. In the example of FIG. 16, planes 603, 604, 605 and 606, as located at the back of the camera 650, are eliminated from the drawn object. Here are performed operations for the texture mapping of the stereo model, if necessary.

The pixel processing unit 430 operates to draw each pixel. For example, the pixel processing unit 430 determines the color of each pixel in the plane by interpolating the colors of the vertexes and determines the color of each pixel while executing the hidden plane erasing operation using the Z-buffer. The pixel processing unit 430 performs this operation for the planes which were drawn by the contour drawing model processing unit 410 and the stereo model processing unit 440.

In the case of FIG. 16, for example, what is drawn is the two planes 601 and 602, as the closest to the camera 650, of the stereo model 600 and the four planes 613, 614, 615 and 616, as the farthest from the camera 650, of the contour drawing model. These four planes of the contour drawing model 610 bulge out of the stereo model 600 to the right and left, as seen from the camera 650, so that only the bulging portions are neither hidden nor erased but are drawn. These bulging portions provide the contouring line. Here, the pixel processing unit 430 determines the color while considering the color of the material of the contour drawing model. Here, the color (e.g., a black or dark contouring color) of the contouring line may be adopted as that of the contour drawing model by ignoring that color of the material absolutely.

Here will be described the processing flow of Embodiment 2. Here, the following routine is executed by the processing unit 103 in cooperation with another component in the computer body 101.

[CD-R Recording Operation]

Figure 17:
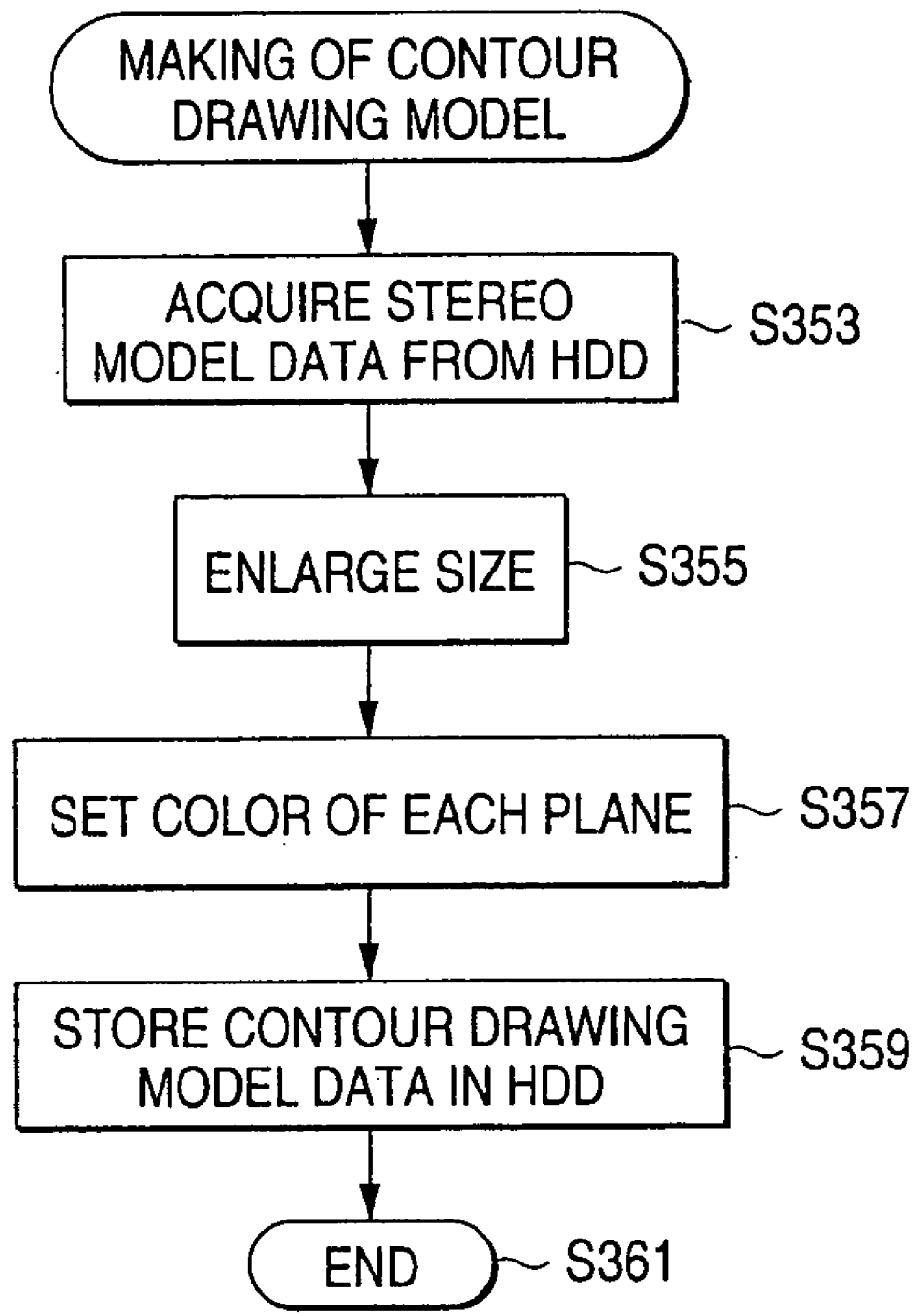
FIG. 17 is a flow chart of making a contour drawing model in Embodiment 2.

FIG. 17 shows a routine of Embodiment 2, in which the contour drawing model is made in advance. When this routine is started, the stereo model data, as stored in advance in the HDD 107, are read out and acquired (at Step S353) as a target model to be converted.

Next, the size of this target model is enlarged (at Step S355). For example, the target model is enlarged in its entirety by about 2% by moving its individual vertexes in the normal directions by a length of 2% of the entire length of the target model. If the target model is exemplified by a human body having a height of about 1.8 m, more specifically, the individual vertexes are moved by a length corresponding to 0.036 m. At a higher enlargement ratio, the contouring line is drawn thick. When this enlargement ratio is so small that the target model is slightly enlarged, the contouring line is drawn thinner. If the enlargement is made not homogeneous but proportional, the contouring line of the more enlarged portion is exclusively drawn thick. This adjustment is usually performed by the producer of the stereo model so that the contouring line drawn can reflect the intention of the producer.

When the normals of the individual vertexes of the stereo model are not defined, the vertexes can also be moved in the normal directions by using the normals of the vertexes, as determined by interpolating the normals of the individual planes sharing the vertexes.

On the other hand, those planes could also be moved in the normal directions of the individual planes of the stereo model. When the planes are simply moved, however, a clearance is left between the planes so that another operation for compensating the clearance is necessary. Since the stereo model is usually defined with a reference position, moreover, the individual vertexes of the corresponding target model can be moved around the reference position of the target model.

Next, the color of the material of each plane of the target model is set (at Step S357) to a color having an identical saturation but a lowered brightness. Here, each plane may be entirely set in a monochromatic color such as black. On the other hand, the setting may be made for mapping the blur expressing texture. The color of the material is adjusted by the producer so that the contouring line can be drawn in the color intended by the producer.

In Embodiment 2, there is not performed the operation to reverse the sides of each plane of the target model. Therefore, the data of the target model thus far converted are stored as the contour drawing model data in the HDD 107 (at Step S359), and the contour drawing model making operation is ended (at Step S361).

Next, the various data, as stored in the HDD 107 to contain the contour drawing model data, are written from the CD-R drive 113 in the CD-R 131. At the level illustrated in FIG. 6, the example of the data written in the CD-R 131 is identical to that of Embodiment 1. The program region 132 is stored with the program for activating the computer 1000 to execute the invention. This program need not contain the operation to write the CD-R 131. The system data region 133 is stored with various data which are to be processed by the program stored in the aforementioned program region 132.

The image data region 134 is stored with data containing contour drawing model data 135. Here, the face and back of each plane of the model, as indicated by the contour drawing model data, are identical to those of the corresponding plane of the stereo model. When the contour drawing model is to be made in the later-described contour drawing model acquiring operation, on the other hand, the contour drawing model data 135 need not be stored. The sound data region 136 is stored with the data for outputting the sound from the sound output device 125 by the sound processing unit 109 shown in FIG. 1.

Here, the contour drawing model to be stored in the CD-R 131 may be defined to have the same size as that of the corresponding stereo model. In this case, after the contour drawing model was acquired by the later-described contour drawing model acquiring operation, it is enlarged by the time the arranging matrix of the contour drawing model is set by the later-described contour drawing model arranging operation. Alternatively, when the arranging matrix of the contour drawing model is set by the contour drawing model arranging operation, the arranging matrix may be so determined as to contain the enlarging conversion. When the stereo model is arranged, on the contrary, the arranging matrix of the stereo model may be so determined as to contain the reducing conversion.

On the other hand, the color of the material of each plane of the contour drawing model to be stored in the CD-R 131 may be identical to that of the material of each plane of the corresponding stereo model. In this case, the contour drawing model is drawn in the color, e.g., black, which has been separately defined at the time of the later-described contour drawing model drawing operation.

[Overall Processing Flow]

The processing flow of the level, as shown in FIG. 7, is identical to that of Embodiment 1. At first, the routine is initialized (at Step S2). This initialization contains the later-described data acquisition (FIG. 18) of the contour drawing model. Then, the state in the virtual space is set (at Step S3). At this time, the positional coordinates of the contour drawing model are determined. Next, it is decided (at Step S4) whether or not the contour is to be drawn. When the contour is to be drawn, the operation to draw the contour drawing model is executed (at Step S5). This will be described later with reference to FIG. 19. No matter whether the contour might be drawn or not, the operation to draw the stereo model is executed (at Step S6). These operations of Step S3 to Step S6 are repeatedly executed until the end of this routine (at Step S7).

[Acquisition of Contour Drawing Model]

Figure 18:
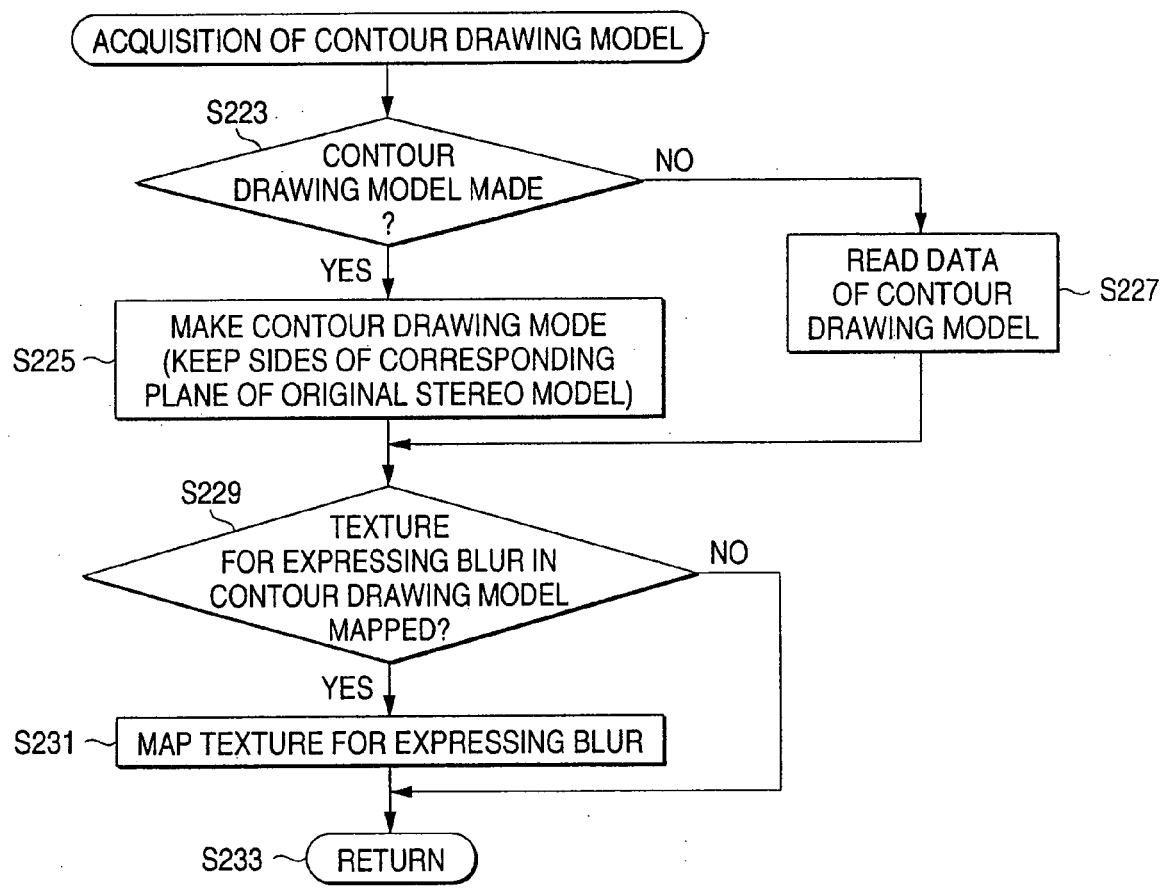
FIG. 18 is a flow chart of a contour drawing model acquisition of Embodiment 2.

FIG. 18 shows the acquisition of the contour drawing model. Here is decided at first (at Step S223) whether or not the contour drawing model is to be made. This is because there are two cases in which the contour drawing model is prepared and in which the contour drawing model is made at this stage. This decision is made, for example, by deciding whether or not the contour drawing model corresponding to the stereo model is stored in the CD-R 131. It is decided not to make the contour drawing model, if it is decided that the contour drawing model is stored, but to make the contour drawing model if it is decided that the contour drawing model is not stored.

When it is decided that the contour drawing model is not made, there are read out (at Step S227) the data of the contour drawing model which are stored in the CD-R 131. Each plane of this contour drawing model has the same sides as those of the corresponding plane of the stereo model, unlike Embodiment 1, as has been described with reference to FIGS. 16 and 17. On the other hand, the contour drawing model to be read is defined to have a larger size than that of the corresponding stereo model. Moreover, the contour drawing model is defined to have a darker color than that of the corresponding stereo model.

If it is decided that the contour drawing model is to be made, the operation to make the contour drawing model is performed (at Step S225). When the contour drawing model is to be made at this stage, as at Step S227, each plane of the contour drawing model has the same sides as those the corresponding plane of the stereo model (as should be referred to FIG. 16).

The contour drawing model is made to have a larger size than that of the corresponding stereo model. As at Step S355 (of FIG. 17), there is made of the contour drawing model which is enlarged by moving the individual vertexes of the stereo model in the normal directions of the vertexes. The contour is drawn thick, when the contour drawing model is larger than the stereo model, but is drawn thinner when the contour drawing model is slightly larger than the stereo model.

As has been described in connection with Step S355 (of FIG. 17), on the other hand, the enlarged contour drawing model may be made by moving the individual planes of the stereo model in the normal directions of the planes. Moreover, the contour drawing model, as enlarged by moving the individual vertexes of the stereo model, may be made around the reference position which is usually defined in the stereo model.

At this time, the contour drawing model may be made to have the same size as that of the corresponding stereo model. In this case, the contour drawing model is enlarged by the time the arranging matrix of the contour drawing model is set by the later-described contour drawing model arranging operation after the contour drawing model was acquired by this contour drawing model acquiring operation. Alternatively, the contour drawing model arranging matrix may be determined to contain the enlarging conversion when it is set by the contour drawing model arranging operation. When the stereo model is to be arranged, on the contrary, the stereo model arranging matrix may be so determined as to contain the reducing conversion.

On the other hand, the color of the material of each plane of the contour drawing model is made darker than that of the material of each plane of the corresponding stereo model. At this time, as has been described in connection with Step S357 (of FIG. 17), the color of the contour drawing model to be made need not be defined. Alternatively, the color of the material of each plane of the contour drawing model may be identical to that of the material of each plane of the corresponding stereo model. In this case, the color of the contour drawing model is not considered at the time of drawing the contour drawing model, but the contour drawing model is drawn either in the separately defined color such as black or in the color of the texture for expressing the blur.

Next, it is decided (at Step S229) whether or not the texture for expressing the blur in the contour drawing model is to be mapped. When the contour drawing model is made at Step S225, that decision is made on the basis of the data of the corresponding stereo model. When the contour drawing model was read out at Step S227, on the other hand, that decision is made on the basis of the data of the contour drawing model read out. When it is decided that the texture for expressing the blur is to be mapped, the texture for expressing the blur in the contour drawing model is mapped at Step S231. In short, texture coordinates (U, V) are set at the individual vertexes of the polygon.

As also described, the texture for expressing the blur has a pattern containing changes in brightness or transparency and is exemplified by the texture shown in FIG. 9. When it is decided that the texture for expressing the blur is not mapped and when the operation to map the texture is ended, the processing unit 103 ends the contour drawing model acquiring operation (at Step S233).

[Contour Drawing Model Arrangement]

At Step S3 of FIG. 7, the arranging matrix of the contour drawing model is set to arrange the contour drawing model. The reference position of the contour drawing model is usually located at a position corresponding to the reference position of the stereo model. Moreover, the contour drawing model arranging matrix is so set that it is arranged at or near the reference position of the stereo model.

When the direction of the stereo model changes, the contour drawing model is also accordingly set with the arranging matrix containing the rotating conversion. When the stereo model changes in shape, the contour drawing model is accordingly deformed.

When the contour drawing model has the same size at this stage as that of the corresponding stereo model, it is enlarged. Specifically, the arranging matrix of the contour drawing model is so set that the individual vertexes of the contour drawing model may be enlarged around the reference position of the contour drawing model at a predetermined enlargement ratio. Alternatively, the stereo model may be reduced to the contrary. In this case, more specifically, the arranging matrix of the stereo model is so set that the individual vertexes of the stereo model may be reduced around the reference position of the stereo model at a predetermined reduction ratio.

Thus, the relatively large contour drawing model is finally arranged to contain the stereo model. Depending upon the relations in the arrangement positions, directions and shapes between the two models, however, the contour drawing model may fail to contain the stereo model completely. In this case, however, the contour is drawn for the contained portion.

Here, the arranging matrix need not always be set at this stage, but there may be fixed individual components necessary for the conversions of vertexes such as the coordinates, the directions, or the enlargement or reduction ratio. In this case, too, the actual vertex conversions are made at the stage of drawing the individual models.

[Drawing of Contour Drawing Model]

Figure 19:
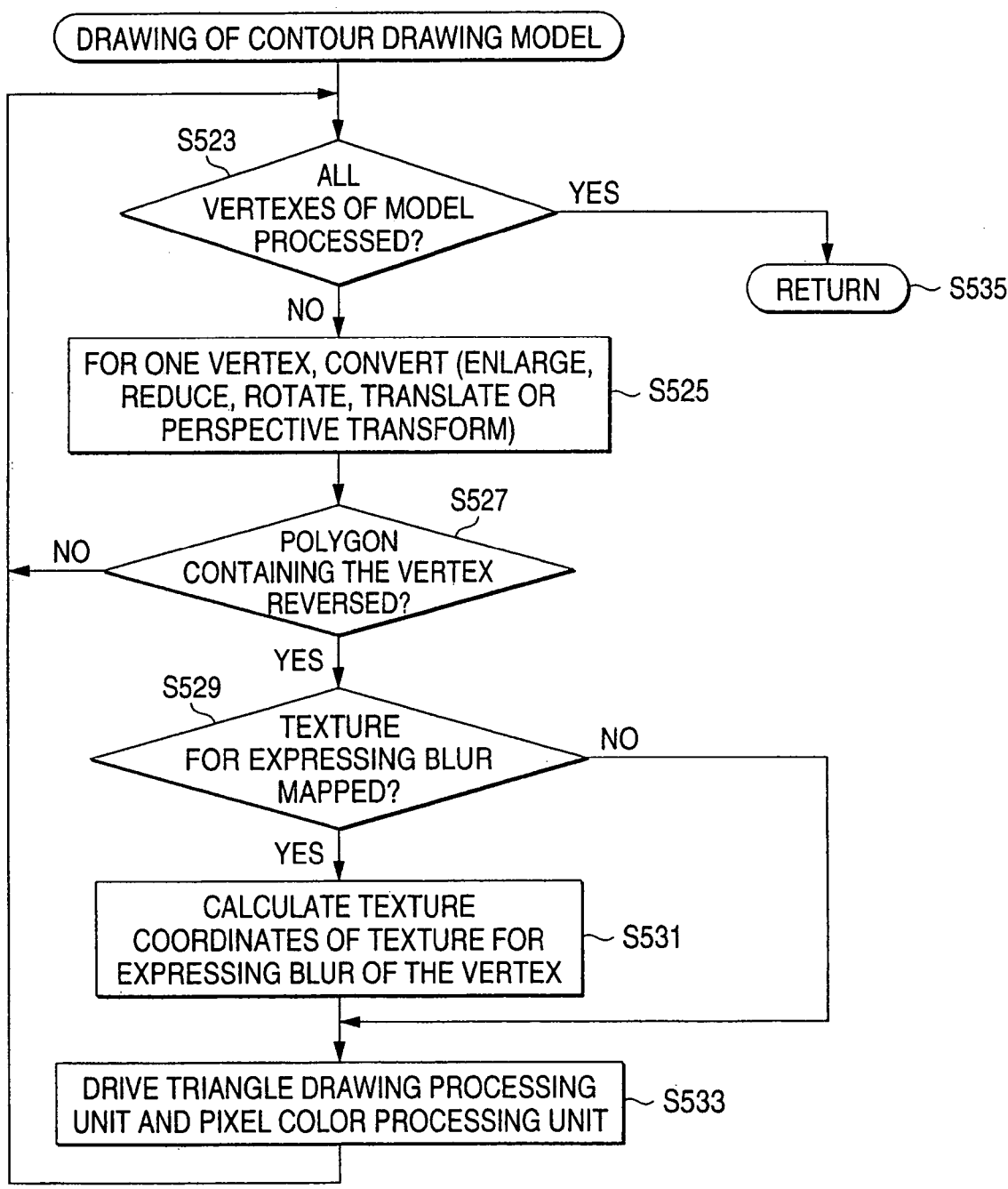
FIG. 19 is a flow chart of drawing a contour drawing model of Embodiment 2.

In FIG. 19 showing a flow of drawing the contour drawing model, the following operations are repeated (at Step S523) until all the vertexes of the contour drawing model are processed. The first one of the repeated operations is to convert (enlarge, reduce, rotate, translate, or perspective transform) each vertex (at Step S525). For example, this operation is executed by the geometric operation unit 205 which is commanded by the processing unit 103.

What should be noted here is that the light source location is not executed for the contour drawing model. This is because the contour has no relation to the location of the light source so that the location is of no use (as the case may be, the color of the material of the contour drawing model is finally ignored). Usually, this vertex conversion is made on the basis of the state which is designated in the virtual three-dimensional space. If the contour drawing model has the same size as that of the stereo model, however, it may be enlarged at this stage in accordance with the arranging matrix set at the arranging operation.

Then, it is decided (at Step S527) whether the polygon (or plane) containing the noticed vertex is on the face or back. Usually, only the face is made the drawn object, but the back is made the drawn object by the ordinary decision reference in the case of the contour drawing model of Embodiment 2. The decision of this Step is made for the triangular polygon in dependence upon what direction the triangular polygon composed of two vertexes processed before that vertex faces in.

As shown in FIG. 11, for example, the plane on this side, as having the vertexes of the triangular polygon numbered counter-clockwise, is defined as the face (i.e., the so-called "right-hand system") according to the ordinary decision reference. In Embodiment 2, the reference for deciding the face and back is inverted such that this side is the face when the vertexes are numbered clockwise. Only the plane that is decided as the face according to that inverted side decision reference is made the drawn object. This is because the face according to the decision reference of Embodiment 2 is decided as the back according to the ordinary decision reference.

Figure 20:
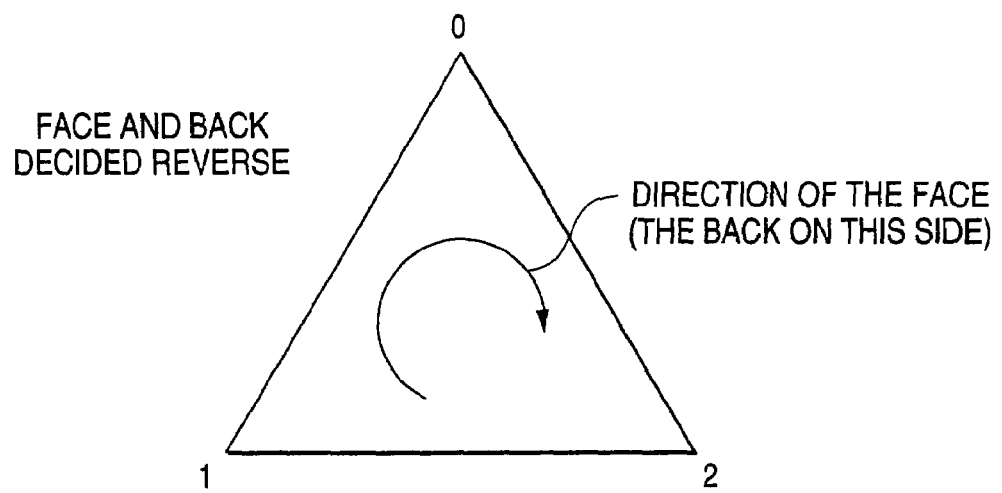
FIG. 20 is a schematic diagram for explaining a decision of the sides of a triangular polygon in Embodiment 2.

FIG. 20 shows an example of the triangular polygon to be decided. The individual vertexes of the triangular polygon shown in FIG. 13 are numbers by the numerals 0, 1 and 2 in the order of the upper, the lefthand lower and the righthand lower vertexes. In the example of FIG. 20, this side is the face according to the vertex numbering, but this side is the back according to the inverted decision reference. In the case of the back according to the inverted decision reference, the plane is usually the front so that it is eliminated from the drawn object. In Embodiment 2, too, the sides are decided at this stage, but the decision could be made beforehand.

If the polygon (or its plane) containing that vertex is the face, the routine returns to Step S523. If the polygon (or its plane) containing the vertex is the back according to the ordinary decision reference, the decision is made (at Step S529) on whether or not the texture for expressing the blur is to be mapped. This implies the texture mapping of the polygon. When the texture for expressing the blur is to be mapped, the texture coordinates of the texture for expressing the blur for that vertex are calculated (at Step S531). Here is performed as the texture perspective processing the calculations of S=U×Q and T=V×Q by using Q=1/w (where letter w indicates the depth from the screen). If the texture for expressing the blur is not mapped, the routine advances to Step S533.

Then, there are driven (at Step S533) the triangle drawing processing unit 205 and the pixel color processing unit 209. As described above, the triangle drawing processing unit 205 generates the data of the individual pixels in the triangular polygon by interpolating the data of the individual vertexes of the triangular polygon. The data of the individual vertexes are the color of the material, the screen coordinate values, and the texture coordinate values if the operation of Step S531 is executed. The data at the individual pixels are the color of the material and the pixel colors if the operation of Step S511 is executed. At this time, however, each vertex can be set with the color of the contour while ignoring the color of the material. Considering the color of the material, on the other hand, the brightness could be set. The pixel color processing unit 209 writes the display image in the frame buffer 213 by using the data at the individual pixels in the triangular polygon generated by the triangle drawing processing unit 205. At this time, the hidden plane erasure is performed by using the Z-buffer 211.

[Drawing of Stereo Model]

The stereo model drawing operation is also identical to that of Embodiment 1 (of FIG. 14). Specifically, the following operations are repeated until all the vertexes of the stereo model are processed (at Step S603). The first one of the repeated operations is to convert (enlarge, reduce, rotate, translate, or perspective transform) each vertex, and to locate the light source (at Step S605). This operation is executed by the geometric operation unit 207, for example, in response to the command from the processing unit 103. The data of the stereo model are stored in the CD-R 131, for example. When the contour drawing model has the same size as that of the stereo model, however, the contour drawing model may be relatively enlarged by reducing the size of the stereo model. In this case, the reducing conversion is executed at Step S605.

Next, it is decided (at Step S607) whether or not the polygon (or plane) containing the noticed vertex is on the face. This decision is made depending upon what direction the triangular polygon composed of the two processed vertexes processed before that vertex faces in the case of the triangular polygon. If the polygon (or plane) containing that vertex is the back, the routine returns to Step S603. If the polygon (or plane) containing that vertex is the face, the texture coordinates of the vertex are calculated (at Step S609). Then, there are driven (at Step S611) the triangle drawing processing unit 205 and the pixel color processing unit 209, as shown in FIG. 2.

As described above, the triangle drawing processing unit 205 generates the data of the individual pixels in the triangular polygon by interpolating the data of the individual vertexes of the triangular polygon. The data of the individual vertexes are the color of the material, the screen coordinate values, and the texture coordinate values. The data at the individual pixels are the color of the material and the pixel colors. The pixel color processing unit 209 writes the display image in the frame buffer 213 by using the data at the individual pixels in the triangular polygon generated by the triangle drawing processing unit 205. At this time, the hidden plane erasure is performed by using the Z-buffer 211.

By executing the operations thus far described, the stereo model is rendered as usual. The contour drawing model, as introduced in Embodiment 2, is drawn at the portion which is at the back of the stereo model but is not hidden by the stereo model, so that the portion is rendered as the contour. In Embodiment 2, the contour can be simply drawn for operations substantially similar to those for the ordinary stereo model merely by introducing the contour drawing model and by inverting the side decision of the contour drawing model.

Other Embodiments (1) In FIGS. 4 and 16, the planes of the contour drawing model and the planes of the stereo model are in one-to-one relationship, but the number of planes of the contour drawing model can be reduced. In the reduced number of planes, the processing can be accelerated. However, the contour drawing model has planes corresponding to the planes of the stereo model.

(2) Step S4 and Step S6 in the processing flow shown in FIG. 7 can be sequentially interchanged.

(3) Change of Hardware Used

In the embodiments thus far disclosed, the operations to draw the stereo model and the contour drawing model are executed by the graphics processing unit 111. The object drawing processing may be entirely executed by either the graphics processing unit 111 or the processing unit 103.

On the other hand, FIG. 1 presents one example, and various modifications could be made. For example, a game device could be provided at the interface unit 117 with an interface for reading/writing a memory card to store the data. On the other hand, it is arbitrary to provide the communications interface 115. Since the invention has no direct relation to the sound processing, it is unnecessary to provide the sound processing unit 109.

On the other hand, the CD-R is one example of the recording medium, which may be exemplified by an internal memory such as a RAM, a floppy disk, a magnetic disk or a DVD-RAM. In this case, the CD-R drive 113 has to be such a drive as to be read/written by a corresponding medium. In the invention, the processing up to the writing in the recording medium and the processing shown in FIG. 7 are independent of each other so that they can be executed by computers different from each other. In the processing shown in FIG. 7, it is sufficient to read the recording medium. Therefore, the computer for the processing shown in FIG. 7 may be provided with a drive capable of reading only the program and data stored in the medium. Specifically, the recording medium may be exemplified by a mainly read only recording medium such as an internal memory such as a ROM, a CD-ROM, a DVD-ROM or a memory cartridge. In this case, the CD-R 113 has to be exemplified by a drive capable of reading the corresponding medium.

Moreover, the description thus far made is on the case in which the invention is packaged by the computer program. However, this packaging can be made either by a combination of the computer program with a dedicated device such as an electronic circuit or by only a dedicated device such as an electronic circuit. At this time, the device may be constructed either for the individual functions expressed by the individual steps of FIGS. 7, 8, 10 and 14 or FIGS. 7, 18, 19 and 14, or for their portion or their combination.

The invention has been specifically described in connection with its embodiments. However, the invention should not be limited to those embodiments but could be suitably modified within the scope of its gist. In the foregoing embodiments, for example, the invention is realized by using the ordinary computer as the platform but could be realized by using a home game machine or an arcade game machine as the platform. As the case may be, it is conceivable to realize the invention by using a mobile information terminal or a car navigation system or the like as the platform.

On the other hand, the programs or data for realizing the invention should not be limited to the mode in which they are provided by the recording medium such as the CD-R made removable from the computer or the game machine. Specifically, the programs or data for realizing the invention may be recorded by the communications interface 115 shown in FIG. 1 on the memory on the side of another device over the network 151 connected through the communications medium 141 and by storing them sequentially, if necessary, in the memory 105 through the communications medium 141.

[Display Example]

Figure 21:
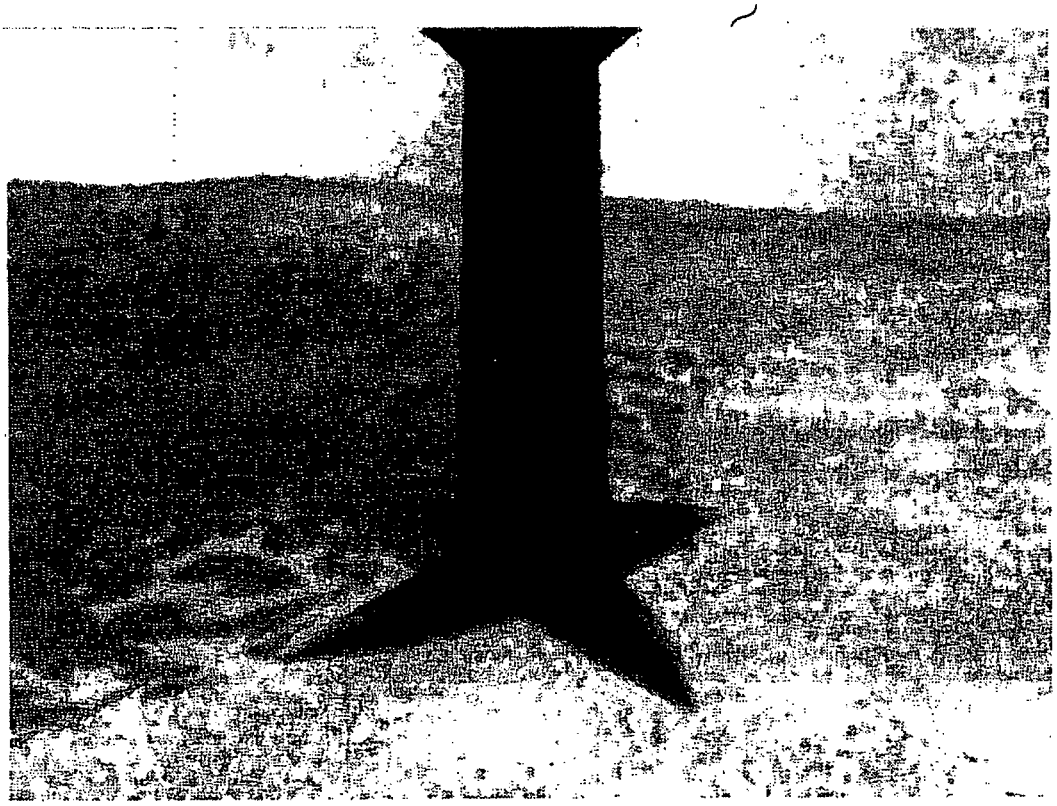
FIG. 21 shows one display example of an image, rendered according to the invention, of the case of a contour drawing model made automatically.
Figure 22:
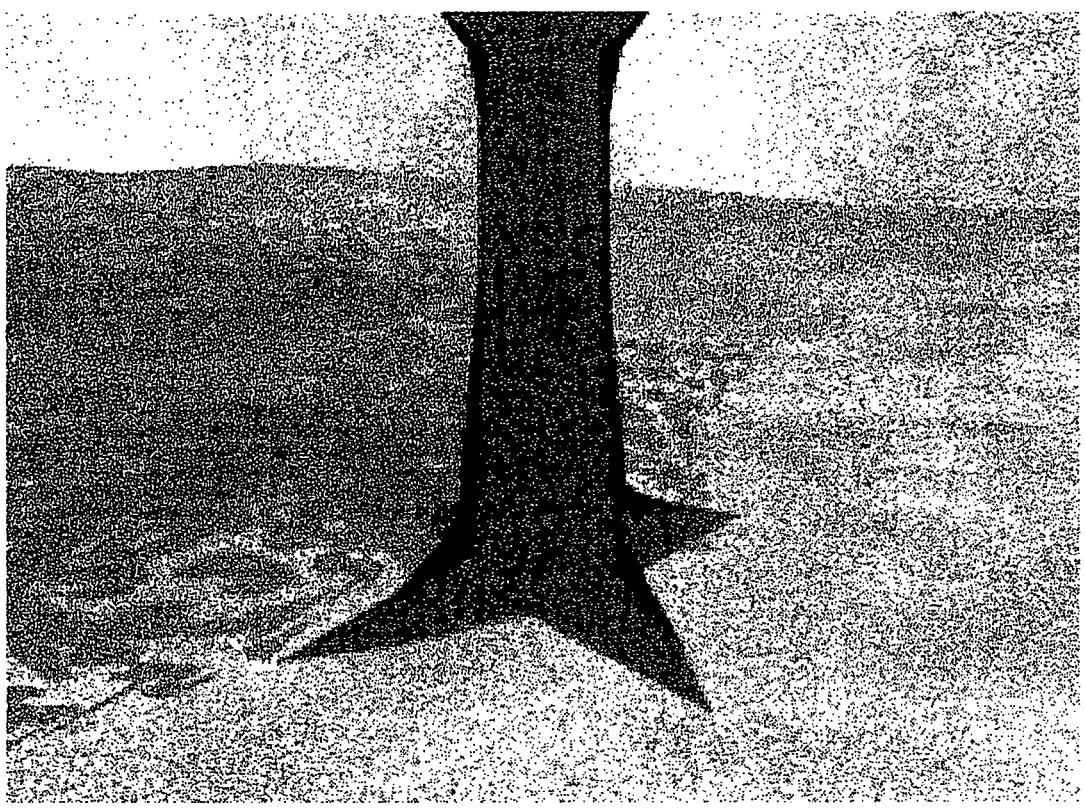
FIG. 22 shows one display example of an image, rendered according to the invention, of the case in which a contour drawing model made manually in advance is used.
Figure 23:
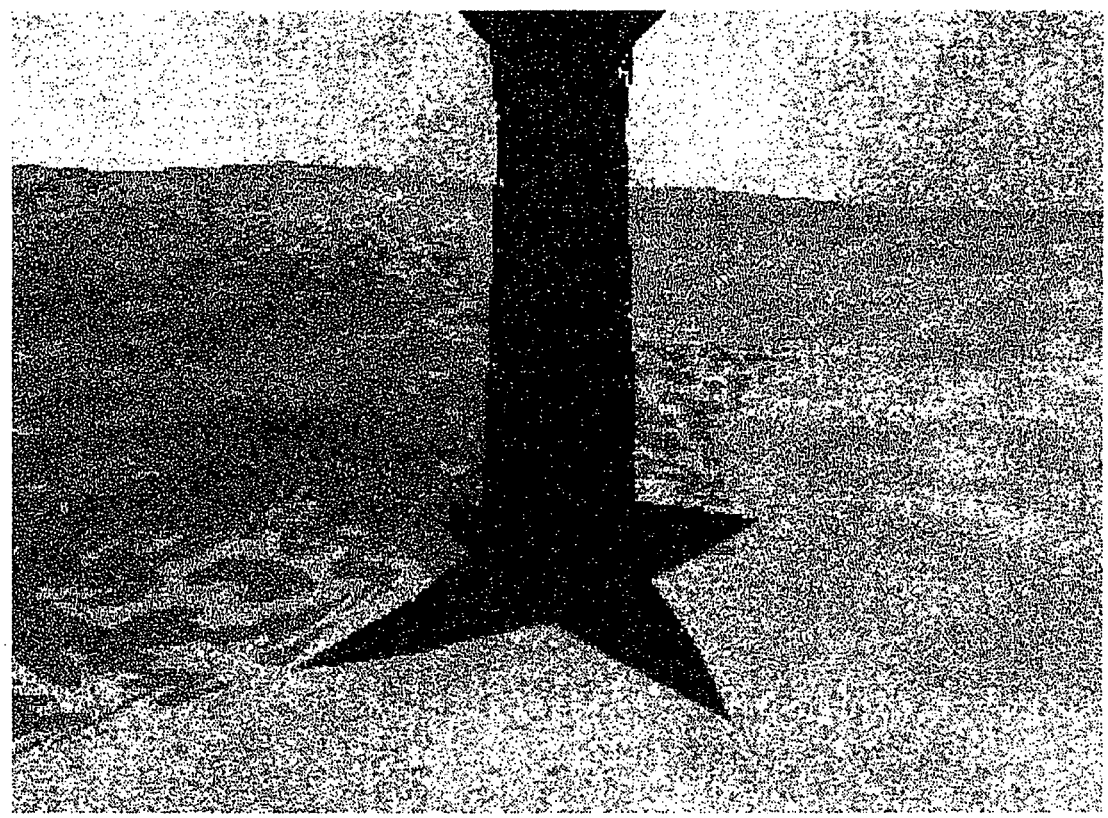
FIG. 23 shows one display example of an image, rendered according to the invention, of the case in which the texture for expressing a blur of FIG. 7 is mapped in the contour drawing model.

FIG. 21 shows an image display example of the case in which the contour drawing model is automatically made from the stereo model and rendered in FIG. 8 or 18. Contouring lines are drawn with substantially equal pitches around the trunk of a tree. On the other hand, FIG. 22 shows an example of the result that the contour drawing model is made in advance in FIG. 5 or 17 and is read out and rendered. If the contour drawing model is properly made, the thin and thick contouring lines can be formed at will. In FIG. 22, for example, the contouring lines are thin at the upper portion of the tree trunk and at the root portion of the tree trunk. In addition, FIG. 23 presents an example of the blur expression of the contouring lines. If the texture of FIG. 9 is mapped on the contour drawing model, for example, the contouring lines are partially deficient, as shown in FIG. 23. This makes it possible to express the contouring lines as if they are hand-written.

According to the invention, as has been described hereinbefore, the contour of the stereo model can be expressed by the simple processing. The use of the contour is exemplified by making cell animations. When these cell animations are to be hand-written, the hand works increase so much that the images cannot be formed in many scenes or at many angles. In a game displaying hand-written game characters, too, the character images cannot be formed for similar reasons at many angles. According to the invention, expressions can be made by using the computer graphics so that an image of an arbitrary scene can be easily formed.

According to the invention, as has been described hereinbefore, it is possible to provide a rendering method and device and a computer readable recording medium stored with a rendering program, which are enabled to draw the contour of a stereo model by drawing the stereo model arranged in a virtual space and by drawing the inside of a contour drawing model corresponding to and containing the stereo model.

This present disclosure relates to subject matter contained in priority Japanese Patent Application No. H 11-260072, filed on Sep. 14, 1999, the contents of which is herein expressly incorporated by reference in its entirety.

What is claimed is:

1. A rendering method for rendering a stereo model arranged in a virtual space and composed of a plurality of planes having faces on the outer side of an object to be expressed, comprising:

acquiring a second stereo model corresponding to a first stereo model;

making a contour drawing model by reversing the individual planes of said second stereo model;

arranging said contour drawing model at a position containing said first stereo model;

determining whether a color of a material of each plane of the contour drawing model and a color of a material of each plane of the first stereo model are identical;

setting a predetermined color to an original color of the contour drawing model when the colors of the materials are not identical;

setting the predetermined color to a new color when the colors of the materials are identical; and drawing said first stereo model from a predetermined viewpoint position and drawing only the planes, as facing said viewpoint position, of said contour drawing model in the predetermined color with an identical saturation as a color of the first stereo model, the predetermined color of the contour drawing model having a lower brightness than the color of the first stereo model.

2. A rendering method for rendering a stereo model arranged in a virtual space and composed of a plurality of planes having faces on the outer side of an object to be expressed, comprising:

acquiring a contour drawing model corresponding to said stereo model and having sides reversed at its planes corresponding to the individual planes of said stereo model;

arranging said contour drawing model at a position containing said stereo model; and drawing said stereo model from a predetermined viewpoint position and drawing only the planes, as facing said viewpoint position, of said contour drawing model, the planes being mapped with a texture having a pattern including fine white oblique lines on a black background.

3. The rendering method according to claim 2, wherein said acquiring further comprises acquiring a contour drawing model corresponding to and larger than said stereo model and having sides reversed at its planes corresponding to the individual planes of said stereo model.

4. The rendering method according to claim 2, wherein said acquiring further comprises acquiring a contour drawing model corresponding to said stereo model, having sides reversed at its planes corresponding to the individual planes of said stereo model and having vertexes corresponding to the individual vertexes of the planes composing said stereo model and set in the normal directions of said individual vertexes.

5. A rendering method for rendering a stereo model which is arranged in a virtual space and composed of a plurality of planes having faces on the outer side of an object to be expressed, comprising:

acquiring a contour drawing model corresponding to said stereo model;

arranging said contour drawing model at a position containing said stereo model; and drawing said stereo model from a predetermined viewpoint position and drawing only the planes, as on the back of said viewpoint position, of said contour drawing model, the planes being mapped with a texture having a pattern containing a change in brightness or transparency, the texture expressing a blur effect.

6. The rendering method according to claim 5, wherein said arranging further comprises enlarging the size of said acquired contour drawing model and arranging said contour drawing model at a position containing said stereo model.

7. The rendering method according to claim 5, further comprising:

enlarging the size of said contour drawing model by moving the individual vertexes of the planes composing said acquired contour drawing model, in the normal directions of said individual vertexes, wherein said arranging further comprises arranging said enlarged contour drawing model, at the position containing said stereo model.

8. The rendering method according to claim 5,
wherein said arranging further comprises reducing the size of said stereo model and arranging said contour drawing model at the position containing said stereo model.

9. A computer-readable recording medium stored with a program for rendering a stereo model arranged in a virtual space and composed of a plurality of planes having faces on the outer side of an object to be expressed,
wherein said program is a program for activating said computer to execute:
acquiring a contour drawing model corresponding to said stereo model and having sides reversed at its planes corresponding to the individual planes of said stereo model, the contour drawing model being mapped with a texture having a pattern containing a change in brightness or transparency, the texture expressing a blur effect;
arranging said contour drawing model at a position containing said stereo model; and
drawing said stereo model from a predetermined viewpoint position and drawing only the planes, as facing said viewpoint position, of said contour drawing model in a predetermined color.

10. The computer-readable recording medium according to claim 9,
wherein said acquiring further comprises acquiring a contour drawing model corresponding to and larger than said stereo model and having sides reversed at its planes corresponding to the individual planes of said stereo model.

11. The computer-readable recording medium according to claim 9,
wherein said acquiring further comprises acquiring a contour drawing model corresponding to said stereo model, having sides reversed at its planes corresponding to the individual planes of said stereo model and having vertexes corresponding to the individual vertexes of the planes composing said stereo model and set in the normal directions of said individual vertexes.

12. A computer-readable recording medium stored with a program for rendering a stereo model arranged in a virtual space and composed of a plurality of planes having faces on the outer side of an object to be expressed,
wherein said program is a program for activating said computer to execute:
acquiring a contour drawing model corresponding to said stereo model;
arranging said contour drawing model at a position containing said stereo model; and
drawing said stereo model from a predetermined viewpoint position and drawing only the planes, as on the back of said viewpoint position, of said contour drawing model, the planes being mapped with a texture having a pattern including fine white oblique lines on a black background.

13. The computer-readable recording medium according to claim 12,
wherein said acquiring further comprises acquiring a contour drawing model corresponding to and larger than said stereo model.

14. The computer-readable recording medium according to claim 12,
wherein said arranging further comprises enlarging the size of said acquired contour drawing model and arranging said contour drawing model at a position containing said stereo model.

15. The computer-readable recording medium according to claim 12,
wherein said arranging further comprises reducing the size of said stereo model and arranging said contour drawing model at the position containing said stereo model.

16. A rendering device for rendering a stereo model arranged in a virtual space and composed of a plurality of planes having faces on the outer side of an object to be expressed, comprising:
an acquisition system that acquires a contour drawing model corresponding to said stereo model and having sides reversed at its planes corresponding to the individual planes of said stereo model;
an arrangement system that arranges said contour drawing model at a position containing said stereo model;
a color determining system that determines whether a color of a material of each plane of the contour drawing model and a color of a material of each plane of the first stereo model are identical; a color setting system that sets a predetermined color to an original color of the contour drawing model when the colors of the materials are not identical, and sets the predetermined color to a new color when the colors of the materials are identical; and
a drawing system that draws said stereo model from a predetermined viewpoint position, drawing only the planes, as facing said viewpoint position, of said contour drawing model in the predetermined color with an identical saturation as a color of the first stereo model, the predetermined color of the contour drawing model having a lower brightness than the color of the first stereo model.

17. A rendering device for rendering a stereo model arranged in a virtual space and composed of a plurality of planes having faces on the outer side of an object to be expressed, comprising:
an acquisition system that acquires a contour drawing model corresponding to said stereo model;
an arrangement system that arranges said contour drawing model at a position containing said stereo model; and
a drawing system that draws said stereo model from a predetermined viewpoint position, drawing only the planes, as on the back of said viewpoint position, of said contour drawing model in a predetermined color, the back of each plane being determined based upon a sign of an outer product of two vectors of the plane.

18. A game device for rendering a stereo model arranged in a virtual space and composed of a plurality of planes having faces on the outer side of an object to be expressed, comprising:
a computer; and
a computer-readable recording medium stored with a program to be executed by said computer,
wherein said program activates said computer to execute:
an acquisition function to acquire a contour drawing model corresponding to said stereo model and having sides reversed at its planes corresponding to the individual planes of said stereo model;
an arrangement function to arrange said contour drawing model at a position containing said stereo model; and
a drawing function to draw said stereo model from a predetermined viewpoint position, drawing only the planes, as facing said viewpoint position, of said contour drawing model in a predetermined color, whether each plane faces the viewpoint being determined based upon a sign of an outer product of two vectors of the plane.

19. A game device for rendering a stereo model arranged in a virtual space and composed of a plurality of planes having faces on the outer side of an object to be expressed, comprising:

a computer; and a computer-readable recording medium stored with a program to be executed by said computer, wherein said program activates said computer to execute:

an acquisition function to acquire a contour drawing model corresponding to said stereo model;

an arrangement function to arrange said contour drawing model at a position containing said stereo model;

a color determining function that determines whether a color of a material of each plane of the contour drawing model and a color of a material of each plane of the first stereo model are identical;

a color setting function that sets a predetermined color to an original color of the contour drawing model when the colors of the materials are not identical, and sets the predetermined color to a new color when the colors of the materials are identical; and a drawing function to draw said stereo model from a predetermined viewpoint position and drawing only the planes, as on the back of said viewpoint position, of said contour drawing model in the predetermined color with an identical saturation as a color of the first stereo model, the predetermined color of the contour drawing model having a lower brightness than the color of the first stereo model.

* * * * *

UNITED STATES PATENT AND TRADEMARK OFFICE
CERTIFICATE OF CORRECTION

PATENT NO. : 6,988,059 B1
APPLICATION NO. : 09/661806
DATED : January 17, 2006
INVENTOR(S) : T. Hasegawa et al.

It is certified that error appears in the above-identified patent and that said Letters Patent is hereby corrected as shown below:

On the Title Page, at Item (56), References Cited, Foreign Patent Documents, page 2, "2000-84396" should be ---2001-84396---.

Signed and Sealed this

Twenty-first Day of November, 2006

JON W. DUDAS
*Director of the United States Patent and Trademark Office*